US012782684B2

(12) United States Patent
Cho et al.

(10) Patent No.: US 12,782,684 B2
(45) Date of Patent: Nov. 3, 2026

(54) OPTICAL IMAGING SYSTEM

(71) Applicant: SAMSUNG ELECTRO-MECHANICS CO., LTD., Suwon-si (KR)

(72) Inventors: Seong Il Cho, Suwon-si (KR); Do Hyeong Jang, Suwon-si (KR); Dong Shin Yang, Suwon-si (KR); Woo Young Kim, Suwon-si (KR); Ho Bin Go, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 241 days.

(21) Appl. No.: 18/661,818

(22) Filed: May 13, 2024

(65) Prior Publication Data

US 2025/0085508 A1 Mar. 13, 2025

(30) Foreign Application Priority Data

Sep. 13, 2023 (KR) ........................ 10-2023-0121962

(51) Int. Cl.

| | |
|---|---|
| ***G02B 13/00*** | (2006.01) |
| ***G02B 9/34*** | (2006.01) |
| ***G02B 13/18*** | (2006.01) |
| ***G02B 27/00*** | (2006.01) |

(52) U.S. Cl.
CPC ............. *G02B 13/004* (2013.01); *G02B 9/34* (2013.01); *G02B 13/18* (2013.01); *G02B 27/0018* (2013.01)

(58) Field of Classification Search
None
See application file for complete search history.

(56) References Cited

U.S. PATENT DOCUMENTS

| | | | | |
|---|---|---|---|---|
| 11,112,589 | B2 | 9/2021 | Song et al. | |
| 2022/0326480 | A1 * | 10/2022 | Kim ......................... | G02B 9/12 |

FOREIGN PATENT DOCUMENTS

| | | | |
|---|---|---|---|
| CN | 111624734 | A | 9/2020 |
| KR | 10-2022-0040962 | A | 3/2022 |

* cited by examiner

*Primary Examiner* — Phu Vu
(74) *Attorney, Agent, or Firm* — NSIP Law

(57) ABSTRACT

An optical imaging system is provided. The optical imaging system includes a first lens, a second lens, a third lens, and a fourth lens arranged in order from an object side toward an image plane, wherein the first lens may be formed of glass, and wherein a conditional expression $70<v1$ and $0.8\leq OAL/f\leq 0.9$ may be satisfied, where v1 is an Abbe number of the first lens, OAL is a distance from an object-side surface of the first lens to the image plane, and f is a total focal length of the optical imaging system.

15 Claims, 20 Drawing Sheets

OPTICAL IMAGING SYSTEM

CROSS-REFERENCE TO RELATED APPLICATIONS

This application claims the benefit under 35 USC § 119(a) of Korean Patent Application No. 10-2023-0121962 filed on Sep. 13, 2023, in the Korean Intellectual Property Office, the entire disclosure of which is incorporated herein by reference for all purposes.

BACKGROUND

1. Field

The following description relates to an optical imaging system, and more specifically, to a mobile telephoto optical imaging system.

2. Description of the Background

There is an increased desire that mobile devices have a slim form factor and high-magnification telephoto camera modules. Since high-magnification telephoto cameras may need a long focal length, there may be a problem that physically, an overall length of the camera must increase. Additionally, a flare phenomenon may be caused by the shape of an image-side surface of a lens disposed close to an image plane, which may cause deterioration of image quality.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an optical imaging system includes a first lens, a second lens, a third lens, and a fourth lens arranged in order from an object side to an image plane, wherein the first lens is formed of glass, and wherein a conditional expression $70<v1$ and $0.8 \leq OAL/f \leq 0.9$ is satisfied, where v1 is an Abbe number of the first lens, OAL is a distance from an object-side surface of the first lens to the image plane, and f is a total focal length of the optical imaging system.

The first lens may have positive refractive power, and wherein a conditional expression $5<f1<10$ is satisfied, where f1 is a focal length of the first lens.

The fourth lens may have a convex image-side surface in a paraxial region.

The fourth lens may have a concave image-side surface in a paraxial region, and a convex surface in a peripheral region.

A conditional expression $4<OAL/\Sigma CT<6$ may be satisfied, where ΣCT is a sum of thicknesses of the first lens to the third lens.

The first lens may be a D-cut lens, and a conditional expression $0.5<AR1<1.0$ is satisfied, where AR1 is an aspect ratio of an effective diameter of the first lens.

A conditional expression $0.4 \leq d2/d1 \leq 1.0$ may be satisfied, where d1 is a distance between the first lens and the second lens, and d2 is a distance between the second lens and the third lens.

The second lens may have negative refractive power, and the second lens may have a concave object-side surface in a paraxial region.

The third lens may have positive refractive power, and a conditional expression $1.3<|f/f2+f/f3| \leq 2.3$ is satisfied, where f2 is a focal length of the second lens, and f3 is a focal length of the third lens.

A conditional expression $0.15<R1/f \leq 0.25$ may be satisfied, where R1 is a radius of curvature of the object-side surface of the first lens.

In a general aspect, an optical imaging system includes a first lens, a second lens, a third lens, and a fourth lens arranged in order from an object side to an image plane, wherein conditional expressions $70<v1$ and $0<v2-3<15$ are satisfied, where v1 is an Abbe number of the first lens, v2 is an Abbe number of the second lens, and v3 is an Abbe number of the third lens.

A conditional expression $0.5 \leq D4/D1 \leq 0.8$ may be satisfied, where D1 is a maximum effective diameter of the first lens, and D4 is a maximum effective diameter of the fourth lens.

In at least one of the second lens and the fourth lens, an object-side surface and an image-side surface thereof may have a concave shape.

The second lens may have a convex image-side surface, and the fourth lens may have a convex image-side surface.

A conditional expression $0.8 \leq OAL/f \leq 0.9$ may be satisfied, where OAL is a distance from an object-side surface of the first lens to the image plane, and f is a total focal length of the optical imaging system.

A conditional expression $0.4 \leq BFL/f \leq 0.6$ may be satisfied, where BFL is a distance from an image-side surface of the fourth lens to the image plane, and f is a total focal length of the optical imaging system.

Other features and aspects will be apparent from the following detailed description, the drawings, and the claims.

Figure 1A:
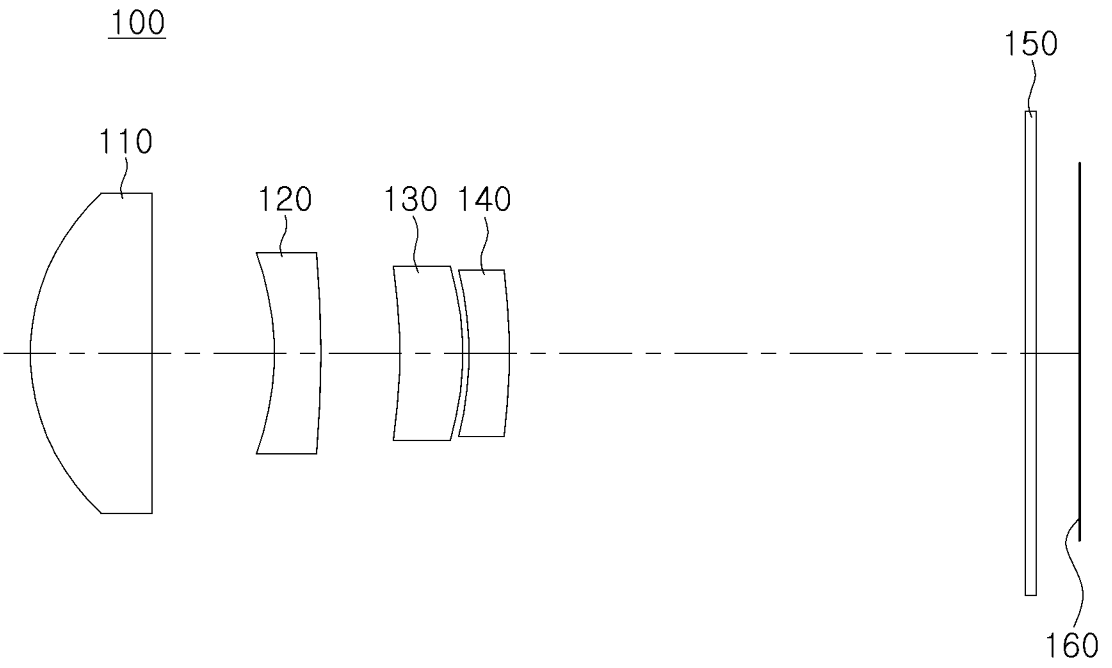
FIG. 1A illustrates an example optical imaging system according to a first embodiment.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as "on," "connected to," "coupled to," or "joined to" another component, element, or layer, it may be directly (e.g., in contact with the other component, element, or layer) "on," "connected to," "coupled to," or "joined to" the other component element, or layer, or there may reasonably be one or more other components elements, or layers intervening therebetween. When a component or element is described as "directly on", "directly connected to," "directly coupled to," or "directly joined to" another component element, or layer, there can be no other components, elements, or layers intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

In the drawings attached to this specification, the thickness, size, and shape of the lens are somewhat exaggerated for explanation, and a spherical or aspherical shape of the lens is only shown as an example and is not limited to this shape.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

One or more examples may provide a compact, high-magnification optical imaging system.

One or more example may also provide an optical imaging system with reduced flare phenomenon.

In the one or more examples, numerical values for a radius of curvature of a lens, a thickness, a gap or a distance, a focal length, and IMG HT (½ of a diagonal length of an image plane) are all in mm, and the unit of a field of view (FOV) may be in degrees. Additionally, a thickness of a lens and a gap between lenses may refer to a thickness and a gap on an optical axis, respectively.

In the one or more examples, an object side may indicate a direction in which an object is disposed, and an image side may indicate, for example, a direction in which an image plane having an image formed thereon is disposed or a direction in which an image sensor is disposed.

In the description related to a shape of a lens in the one or more examples, the disclosure that one surface is convex denotes that a paraxial region of the corresponding surface is convex, and the disclosure that the one surface is concave denotes that the paraxial region of the corresponding surface is concave. Accordingly, even if one surface of the lens is described as having a convex shape, an edge of the lens may be concave. Similarly, even if one surface of the lens is described as having a concave shape, an edge of the lens may have a convex shape.

An optical imaging system, according to the example embodiments, may form a portion of a camera module mounted on a mobile device. For example, the mobile device may be any type of portable electronic device, such as, but not limited to, a mobile communication terminal, smartphone, or tablet personal computer (PC).

In the example embodiments, an optical imaging system may include four lenses. Specifically, the optical imaging system may include a first lens, a second lens, a third lens, and a fourth lens arranged in order from the object side to the imaging plane.

In an example, the optical imaging system according to the example embodiments may not be comprised of only four lenses, but may further include an image sensor that converts incident light into an electrical signal, an infrared blocking filter that blocks light in an infrared region, and an aperture that adjusts an amount of light. In example embodiments, the infrared blocking filter may be disposed between the fourth lens and the image sensor, and the aperture may be disposed on an image side of the second lens.

In example embodiments, the optical imaging system may include at least one glass lens. Specifically, in a non-limited example, a first lens may be formed of glass, and the second to fourth lenses may be formed of plastic.

Additionally, at least one of the first to fourth lenses may be an aspherical lens. In other words, at least one of the first to fourth lenses, at least one of an object-side surface and an image-side surface may be an aspherical surface. The aspherical surface of the lens is expressed by Equation 1 below.

Equation 1

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30}$$

In Equation 1, c represents an inverse number of the radius of curvature of the lens, K represents the conic constant, and Y represents a distance from any point on an aspherical surface of the lens to the optical axis. Additionally, constants A to H, J, and L to P, are aspherical constants from fourth to thirtieth order, and Z (or SAG) is a distance in an optical axis direction between any point on the aspherical surface and a vertex of the corresponding aspherical surface.

An example optical imaging system according to the example embodiments may satisfy one or more of the following conditional expressions.

$$5 < f1 < 10 \quad \text{[Conditional expression 1]}$$

$$70 < v1 \quad \text{[Conditional expression 2]}$$

$$0.5 < AR1 < 1.0 \quad \text{[Conditional expression 3]}$$

$$0.4 \le d2/d1 \le 1.0 \quad \text{[Conditional expression 4]}$$

$$0.5 \le D4/D1 \le 0.8 \quad \text{[Conditional expression 5]}$$

$$1.3 < |f/f2 + f/f3| \le 2.3 \quad \text{[Conditional expression 6]}$$

$$0.8 \le OAL/f \le 0.9 \quad \text{[Conditional expression 7]}$$

$$0.4 \le BFL/f \le 0.6 \quad \text{[Conditional expression 8]}$$

$$0.15 < R1/f \le 0.25 \quad \text{[Conditional expression 9]}$$

$$0 < v2 - v3 < 15 \quad \text{[Conditional expression 10]}$$

$$1.7 \le OAL/f1 \le 2.5 \quad \text{[Conditional expression 11]}$$

$$IMH/R8 \le 0.4 \quad \text{[Conditional expression 12]}$$

In the conditional expressions, f is a total focal length of the optical imaging system, f1 is the focal length of the first lens, f2 is a focal length of the second lens, and f3 is a focal length of the third lens. v1 is an Abbe number of the first lens, v2 is an Abbe number of the second lens, and v3 is an Abbe number of the third lens. AR1 is an aspect ratio of a first lens effective diameter, and R1 is a radius of curvature of an object-side surface of the first lens. D1 is a maximum effective diameter of the first lens, D4 is a maximum effective diameter of the fourth lens, d1 is a gap between the first lens and the second lens, d2 is a gap between the second lens and the third lens, and ΣCT is a sum of the thicknesses of the first to third lenses. OAL is a distance from the object-side surface of the first lens to an image plane, BFL is a distance from an image-side surface of the fourth lens to the image plane, IMH is half a diagonal length of a sensor, and R8 is a radius of curvature of the image-side surface of the fourth lens.

[Conditional Expression 1], [Conditional Expression 9], and [Conditional Expression 11] are conditional expressions that limit the focal length of the first lens formed of glass. In an example of deviating from the conditional expressions, it may be difficult to form an appropriate focal length for the telephoto camera.

[Conditional Expression 2] is a conditional expression related to the Abbe number of the first lens formed of glass, and Glass lenses have a characteristic of having a larger Abbe number than plastic lenses, and if it deviates from the conditional expression, chromatic aberration correction may be difficult.

Additionally, [Conditional Expression 10] is a conditional expression related to the difference in Abbe numbers of the second and third lenses, and in an example of deviating from the conditional expression, it may be difficult to correct chromatic aberration.

[Conditional Expression 3] is a conditional expression (an aspect ratio of the first lens) indicating that the first lens is a D-cut lens, and in a case of deviating from the conditional expression, a module size increases.

[Conditional Expression 5] is an effective diameter ratio of the first lens and the fourth lens, and in a case of deviating from the conditional expression, it may be difficult to assemble the lens.

[Conditional Expression 4] is a ratio of a gap between the second lens and the third lens to a gap between the first lens and the second lens, and when the conditional equation is satisfied, aberration may be reduced.

[Conditional Expression 6] is a conditional expression that limits appropriate refractive power of the second and third lenses, and in a case of deviating from the conditional expression, it may be difficult to perform aberration correction.

[Conditional Expression 7] and [Conditional Expression 8] are conditional expressions related to the characteristics of a telephoto camera, and in a case of deviating from the conditional expressions, it may be difficult to secure performance.

[Conditional Expression 12] is a conditional expression related to the shape of the paraxial region of the image-side surface of the fourth lens. In a case of deviating from the conditional expression, a flare reduction effect is reduced.

Hereinafter, an optical imaging system according to the example embodiments will be described with reference to the attached drawings.

First Embodiment

Figure 1B:
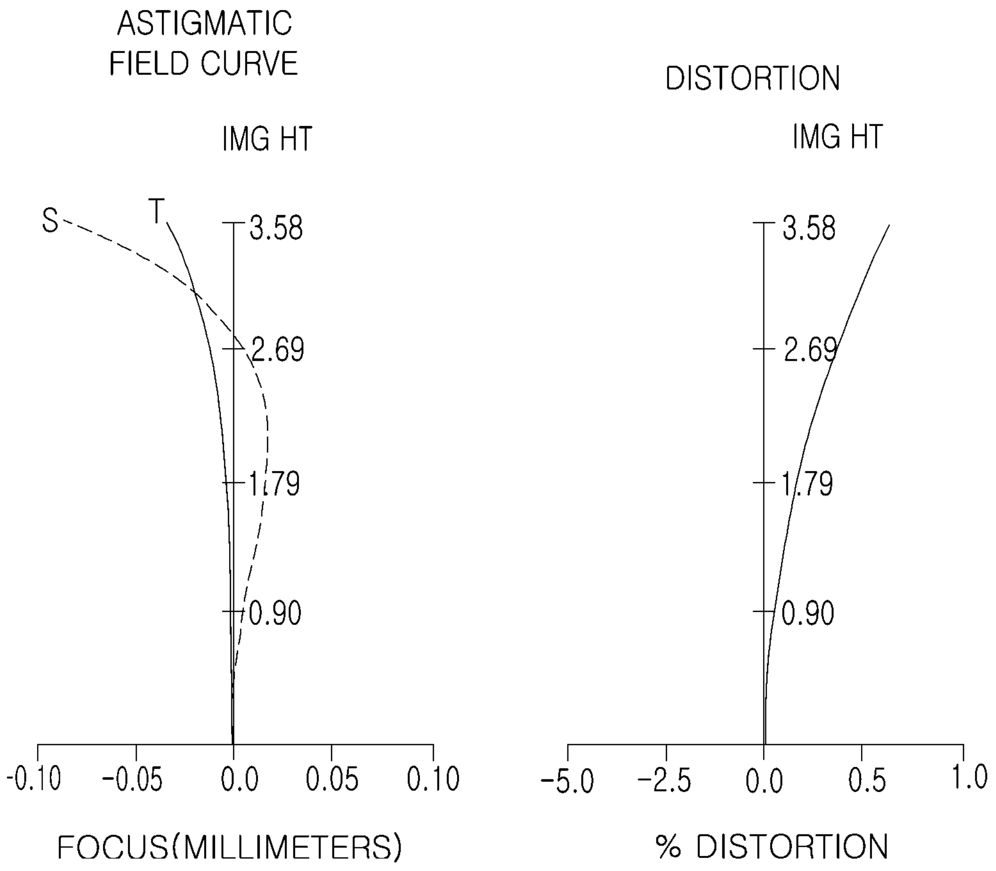
FIG. 1B is a graph illustrating aberration characteristics of the example optical imaging system according to the first embodiment.

FIG. 1A illustrates an example optical imaging system according to a first embodiment, and FIG. 1B is a graph illustrating aberration characteristics of the example optical imaging system according to the first embodiment.

An optical imaging system 100 according to the first embodiment may include a first lens 110, a second lens 120, a third lens 130, and a fourth lens 140 arranged in order from an object side to an imaging plane, and may further an infrared blocking filter 150 and an image sensor 160 on an image side of the fourth lens 140.

The first lens 110 may have positive refractive power. An object-side surface and an image-side surface of the first lens 110 may have a convex shape in the paraxial region. The first lens 110 may be formed of glass. The object-side surface and the image-side surface of the first lens 110 may be spherical. The first lens 110 may be a D-cut lens. The D-cut lens may refer to a lens in which a length thereof in a first axis direction, perpendicular to an optical axis direction, is longer than a length thereof in a second axis direction, perpendicular to both the optical axis direction and the first axis direction. That is, the length of the first lens 110 in the first axis direction, perpendicular to the optical axis direction, may be longer than the length in the second axis direction, perpendicular to both the optical axis direction and the first axis direction.

The second lens 120 may have negative refractive power. An object-side surface of the second lens 120 may have a concave shape in the paraxial region, and an image-side surface of the second lens 120 may have a convex shape in the paraxial region. The second lens 120 may be formed of plastic. The object-side surface and the image-side surface of the second lens 120 may be aspherical.

The third lens 130 may have positive refractive power. An object-side surface of the third lens 130 may have a concave shape in the paraxial region, and an image-side surface of the third lens 130 may have a convex shape in the paraxial region. The third lens 130 may be formed of plastic. Specifically, the third lens 130 may be formed of a plastic material with optical properties (e.g., different refractive index and Abbe number) different from the second lens 120. The object-side surface and the image-side surface of the third lens 130 may be aspherical.

The fourth lens 140 may have negative refractive power. An object-side surface of the fourth lens 140 may have a concave shape in the paraxial region, and an image-side surface of the fourth lens 140 may have a convex shape in the paraxial region. The fourth lens 140 may be formed of plastic. Specifically, the fourth lens 140 may be formed of a plastic material with optical properties (e.g., different refractive index and Abbe number) different from the third lens 130. The object-side surface and the image-side surface of the fourth lens 140 may be aspherical.

Table 1 illustrates optical and physical parameters of the optical imaging system 100 according to the first embodiment.

TABLE 1

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 4.200 | 2.220 | 1.437 | 95.0 | 3.00 |
| 3 | −275.063 | 2.166 | | | 2.68 |
| 4 | −6.000 | 0.882 | 1.614 | 25.9 | 1.88 |
| 5 | −19.338 | 1.408 | | | 1.70 |
| 6 | −8.389 | 1.161 | 1.671 | 19.2 | 1.62 |
| 7 | −8.353 | 0.100 | | | 1.58 |
| 8 | −10.520 | 0.732 | 1.544 | 56.0 | 1.53 |
| 9 | −27.472 | 9.431 | | | 1.56 |
| 10 | Infinity | 0.210 | 1.518 | 64.2 | 4.50 |
| 11 | Infinity | 0.791 | | | 4.50 |
| Image | Infinity | | | | 3.59 |

Table 2 illustrates aspheric data of the optical imaging system 100 according to the first

TABLE 2

| Surface | 2 | 3 | 4 | 5 | 6 | 7 | 8 | 9 |
|---|---|---|---|---|---|---|---|---|
| K | 0.00E+00 | 0.00E+00 | −2.59E−01 | 1.12E+01 | 3.13E+00 | 1.25E+01 | −2.44E+01 | 1.25E+01 |
| A | 0.00E+00 | 0.00E+00 | −1.77E−03 | −4.23E−04 | 1.45E−03 | 7.04E−04 | −9.03E−03 | −9.94E−04 |
| B | 0.00E+00 | 0.00E+00 | 3.56E−04 | 4.92E−04 | 1.67E−03 | −5.23E−04 | −1.61E−03 | −2.54E−04 |

TABLE 2-continued

| Surface | 2 | 3 | 4 | 5 | 6 | 7 | 8 | 9 |
|---|---|---|---|---|---|---|---|---|
| C | 0.00E+00 | 0.00E+00 | 6.45E−07 | −6.87E−06 | 1.94E−03 | −3.21E−04 | −6.02E−04 | −1.95E−04 |
| D | 0.00E+00 | 0.00E+00 | 1.21E−06 | 1.55E−05 | −2.19E−02 | −1.82E−04 | −3.13E−04 | −3.53E−05 |
| E | 0.00E+00 | 0.00E+00 | 0.00E+00 | 0.00E+00 | 7.05E−02 | 2.60E−05 | 4.55E−05 | 1.92E−05 |
| F | 0.00E+00 | 0.00E+00 | 0.00E+00 | 0.00E+00 | −1.35E−01 | 2.84E−08 | 2.31E−07 | 6.07E−08 |
| G | 0.00E+00 | 0.00E+00 | 0.00E+00 | 0.00E+00 | 1.73E−01 | 0.00E+00 | 0.00E+00 | 0.00E+00 |
| H | 0.00E+00 | 0.00E+00 | 0.00E+00 | 0.00E+00 | −1.56E−01 | 0.00E+00 | 0.00E+00 | 0.00E+00 |
| J | 0.00E+00 | 0.00E+00 | 0.00E+00 | 0.00E+00 | 9.84E−02 | 0.00E+00 | 0.00E+00 | 0.00E+00 |
| L | 0.00E+00 | 0.00E+00 | 0.00E+00 | 0.00E+00 | −4.34E−02 | 0.00E+00 | 0.00E+00 | 0.00E+00 |
| M | 0.00E+00 | 0.00E+00 | 0.00E+00 | 0.00E+00 | 1.31E−02 | 0.00E+00 | 0.00E+00 | 0.00E+00 |
| N | 0.00E+00 | 0.00E+00 | 0.00E+00 | 0.00E+00 | −2.54E−03 | 0.00E+00 | 0.00E+00 | 0.00E+00 |
| O | 0.00E+00 | 0.00E+00 | 0.00E+00 | 0.00E+00 | 2.88E−04 | 0.00E+00 | 0.00E+00 | 0.00E+00 |
| P | 0.00E+00 | 0.00E+00 | 0.00E+00 | 0.00E+00 | −1.44E−05 | 0.00E+00 | 0.00E+00 | 0.00E+00 |

Second Embodiment

Figure 2A:
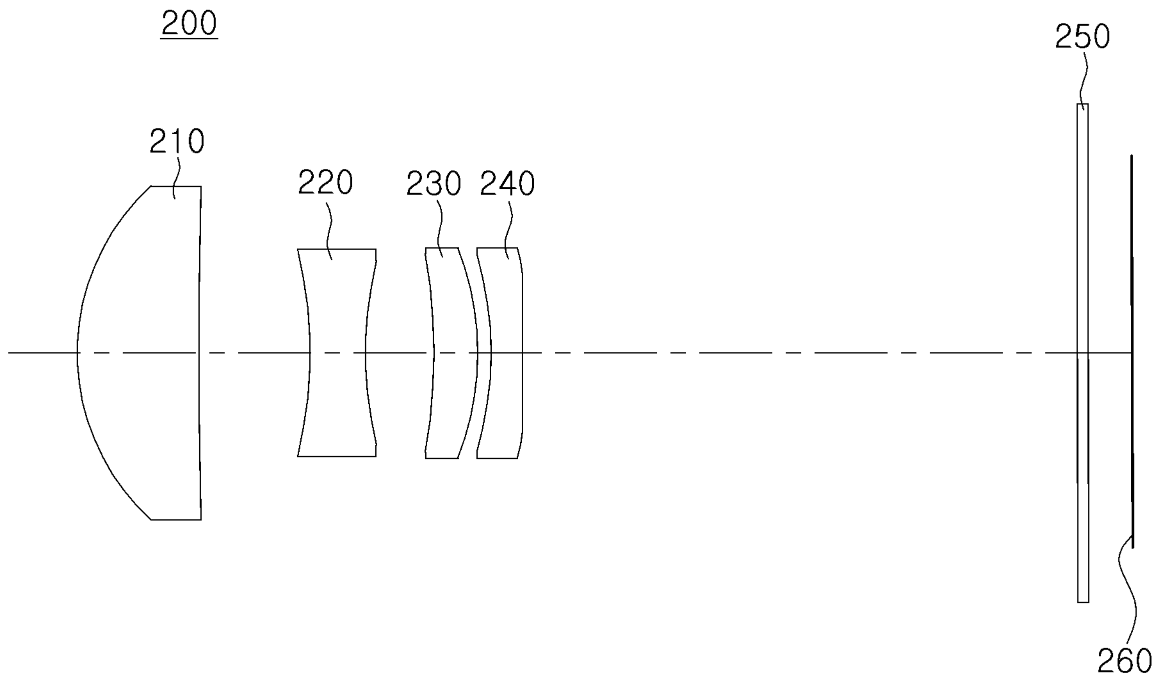
FIG. 2A illustrates an example optical imaging system according to a second embodiment.
Figure 2B:
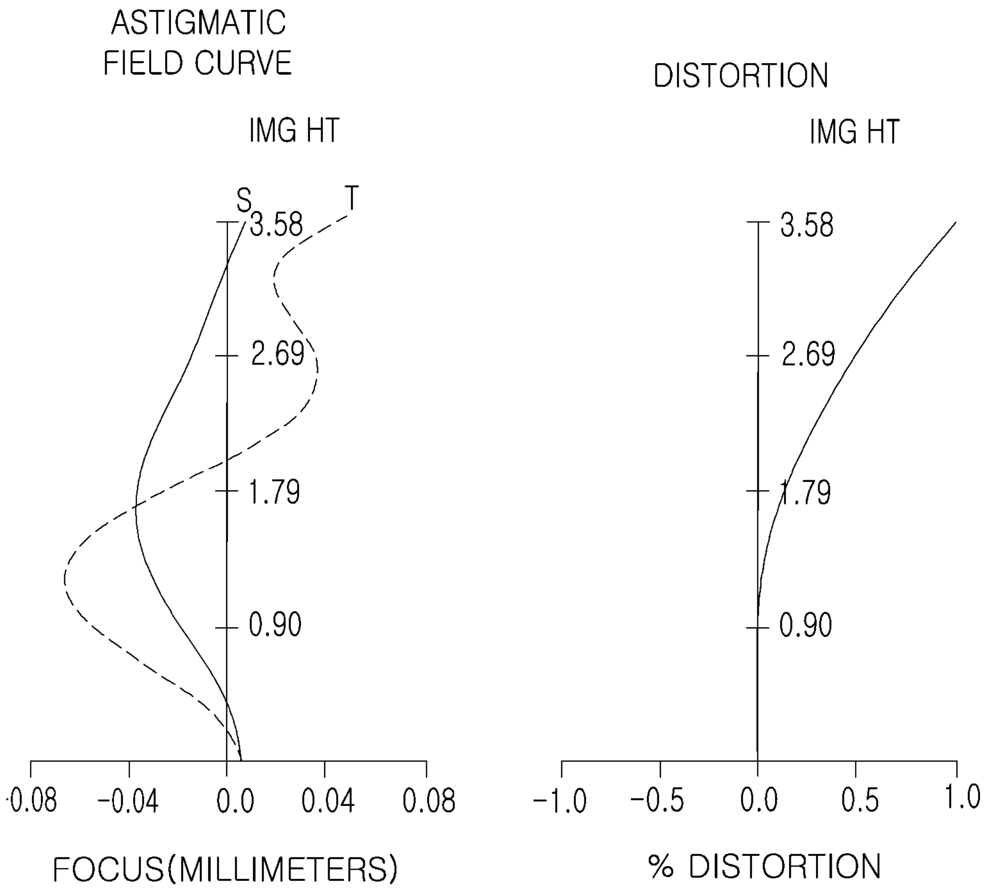
FIG. 2B is a graph illustrating aberration characteristics of the example optical imaging system according to the second embodiment.

FIG. 2A illustrates an example optical imaging system according to a second embodiment, and FIG. 2B is a graph illustrating aberration characteristics of an optical imaging system according to the second embodiment of.

An optical imaging system 200 according to the second embodiment may include a first lens 210, a second lens 220, a third lens 230, and a fourth lens 240 arranged in order from an object side to an imaging plane, and may further include an infrared blocking filter 250 and an image sensor 260 on an image side of the fourth lens 240.

The first lens 210 may have positive refractive power. An object-side surface of the first lens 210 may have a convex shape in the paraxial region, and an image-side surface of the first lens 210 may have a concave shape in the paraxial region. The first lens 210 may be formed of glass. The object-side surface and the image-side surface of the first lens 210 may be spherical. The first lens 210 may be a D-cut lens. For example, a length of the first lens 210 in the first axis direction, perpendicular to the optical axis direction, may be longer than a length thereof in the second axis direction, perpendicular to both the optical axis direction and the first axis direction.

The second lens 220 may have negative refractive power. An object-side surface and an image-side surface of the second lens 220 may have a concave shape in the paraxial region. The second lens 220 may be formed of plastic. The object-side surface and the image-side surface of the second lens 220 may be aspherical.

The third lens 230 may have positive refractive power. An object-side surface of the third lens 230 may have a concave shape in the paraxial region, and an image-side surface of the third lens 230 may have a convex shape in the paraxial region. The third lens 230 may be formed of plastic. Specifically, the third lens 230 may be formed of a plastic material with optical properties (e.g., different refractive index and Abbe number) different from the second lens 220. The object-side surface and the image-side surface of the third lens 230 may be aspherical.

The fourth lens 240 may have negative refractive power. An object-side surface and an image-side surface of the fourth lens 240 may have a concave shape in the paraxial region. The fourth lens 240 may be formed of plastic. Specifically, the fourth lens 240 may be formed of a plastic material with optical properties (e.g., different refractive index and Abbe number) different from the third lens 230. The object-side surface and the image-side surface of the fourth lens 240 may be aspherical. Additionally, the image-side surface of the fourth lens 240 may include an inflection point. For example, the image-side surface of the fourth lens 240 may have a concave shape in the paraxial region and may have a convex shape in the peripheral region.

Table 3 illustrates optical and physical parameters of the optical imaging system 200 according to the second embodiment.

TABLE 3

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 4.028 | 2.153 | 1.497 | 81.6 | 3.00 |
| 3 | 33.867 | 2.070 | | | 2.70 |
| 4 | −6.913 | 0.998 | 1.614 | 25.9 | 1.90 |
| 5 | 12.121 | 1.210 | | | 1.76 |
| 6 | −10.698 | 0.795 | 1.661 | 20.4 | 1.90 |
| 7 | −5.267 | 0.225 | | | 1.87 |
| 8 | −60.936 | 0.610 | 1.544 | 56.0 | 1.85 |
| 9 | 30.000 | 10.039 | | | 1.90 |
| 10 | Infinity | 0.210 | 1.518 | 64.2 | 4.50 |
| 11 | Infinity | 1.000 | | | 4.50 |
| Image | Infinity | | | | 3.59 |

Table 4 illustrates aspheric data of the optical imaging system 200 according to the second embodiment.

TABLE 4

| Surface | 2 | 3 | 4 | 5 | 6 | 7 | 8 | 9 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| A | 0.00E+00 | 0.00E+00 | 1.38E−04 | 2.78E−03 | 1.65E−03 | 1.64E−04 | −1.96E−02 | −1.85E−02 |
| B | 0.00E+00 | 0.00E+00 | 1.19E−03 | 2.22E−03 | 1.59E−04 | 9.52E−04 | 2.16E−03 | 3.25E−03 |
| C | 0.00E+00 | 0.00E+00 | −6.39E−04 | −1.27E−03 | −1.03E−04 | −3.28E−04 | 4.01E−04 | −9.71E−04 |
| D | 0.00E+00 | 0.00E+00 | 3.27E−04 | 9.03E−04 | 1.67E−04 | −1.59E−05 | −6.32E−04 | 2.07E−04 |
| E | 0.00E+00 | 0.00E+00 | −1.11E−04 | −3.42E−04 | −6.64E−05 | 3.80E−05 | 1.99E−04 | −2.17E−05 |
| F | 0.00E+00 | 0.00E+00 | 2.01E−05 | 6.64E−05 | 9.74E−06 | −1.61E−05 | −1.97E−05 | 8.47E−07 |
| G | 0.00E+00 | 0.00E+00 | −1.46E−06 | −4.86E−06 | 0.00E+00 | 4.85E−06 | 0.00E+00 | 0.00E+00 |
| H | 0.00E+00 | 0.00E+00 | 0.00E+00 | 0.00E+00 | 0.00E+00 | −7.21E−07 | 0.00E+00 | 0.00E+00 |
| J | 0.00E+00 | 0.00E+00 | 0.00E+00 | 0.00E+00 | 0.00E+00 | 4.10E−08 | 0.00E+00 | 0.00E+00 |
| L | 0.00E+00 | 0.00E+00 | 0.00E+00 | 0.00E+00 | 0.00E+00 | 0.00E+00 | 0.00E+00 | 0.00E+00 |

TABLE 4-continued

| Surface | 2 | 3 | 4 | 5 | 6 | 7 | 8 | 9 |
|---|---|---|---|---|---|---|---|---|
| M | 0.00E+00 | 0.00E+00 | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 | 0.00E+00 | 0.00E+00 |

Third Embodiment

Figure 3A:
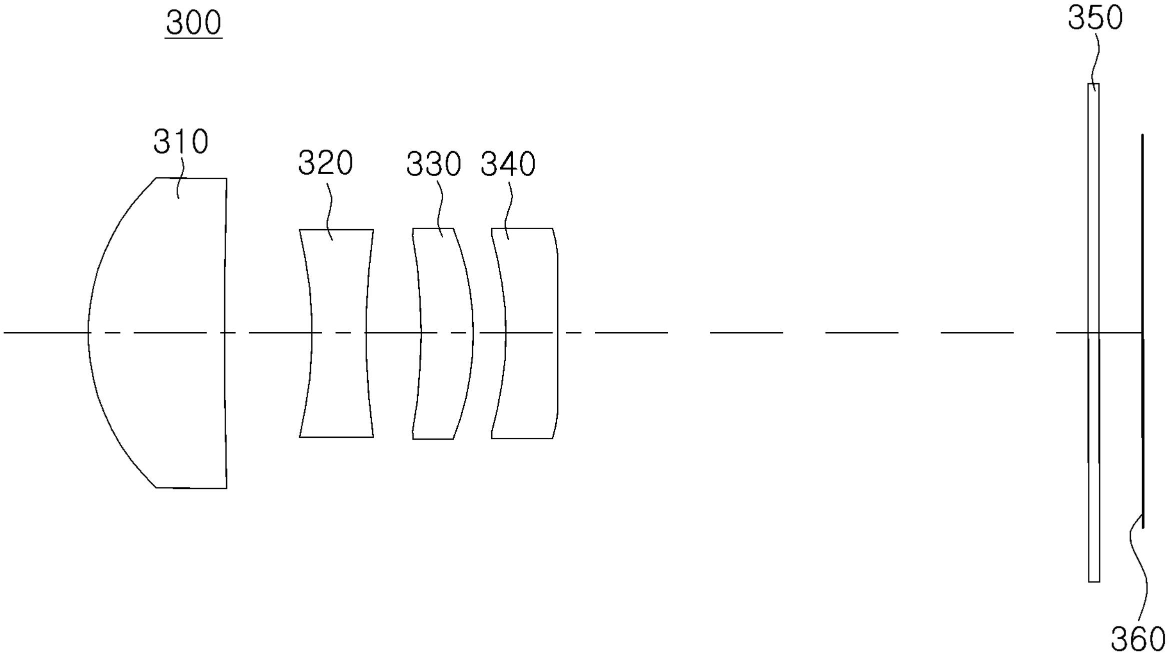
FIG. 3A illustrates an example optical imaging system according to a third embodiment.
Figure 3B:
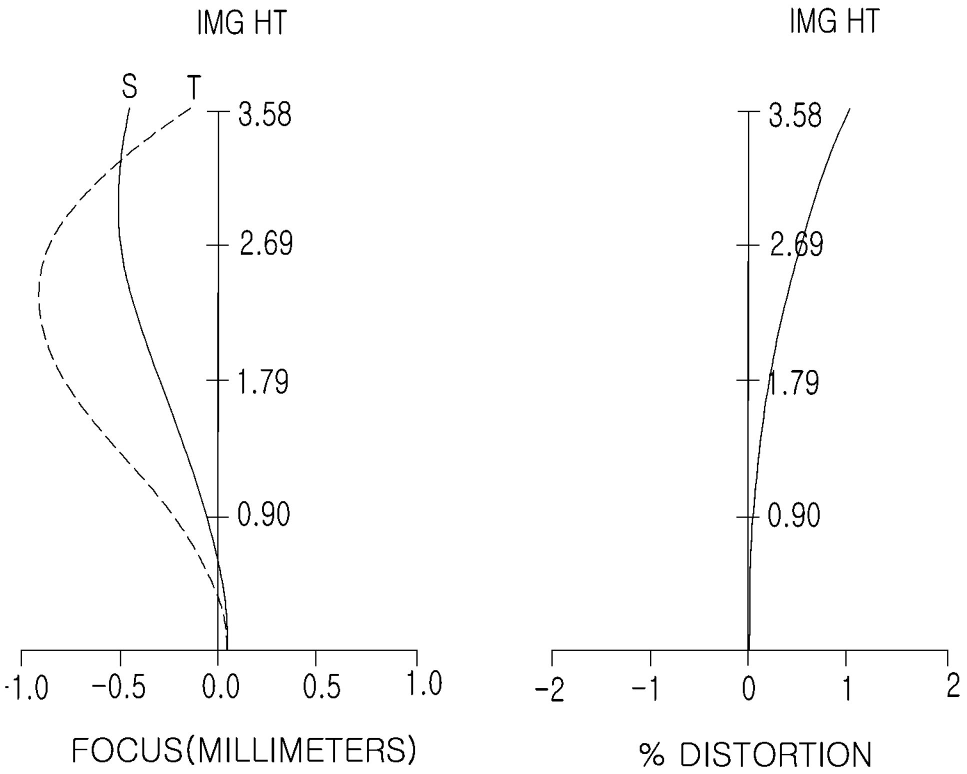
FIG. 3B is a graph illustrating aberration characteristics of the example optical imaging system according to the third embodiment.

FIG. 3A illustrates an example optical imaging system according to a third embodiment, and FIG. 3B is a graph illustrating aberration characteristics of an optical imaging system according to the third embodiment.

An optical imaging system 300 according to the third embodiment may include a first lens 310, a second lens 320, a third lens 330, and a fourth lens 340 arranged in order from an object side to an imaging plane, may further include an infrared blocking filter 350 and an image sensor 360 on an image side of the fourth lens 340.

The first lens 310 may have positive refractive power. An object-side surface of the first lens 310 may have a convex shape in the paraxial region, and an image-side surface of the first lens 310 may have a concave shape in the paraxial region. The first lens 310 may be formed of glass. The object-side surface and the image-side surface of the first lens 310 may be spherical. The first lens 310 may be a D-cut lens. For example, a length of the first lens 310 in the first axis direction, perpendicular to the optical axis direction, may be longer than a length thereof in the second axis direction, perpendicular to both the optical axis direction and the first axis direction.

The second lens 320 may have negative refractive power. An object-side surface and an image-side surface of the second lens 320 may have a concave shape in the paraxial region. The second lens 320 may be formed of plastic. The object-side surface and the image-side surface of the second lens 320 may be aspherical.

The third lens 330 may have positive refractive power. An object-side surface of the third lens 330 may have a concave shape in the paraxial region, and an image-side surface of the third lens 330 may have a convex shape in the paraxial region. The third lens 330 may be formed of plastic. Specifically, the third lens 330 may be formed of a plastic material with optical properties (e.g., different refractive index and Abbe number) different from the second lens 320. The object-side surface and the image-side surface of the third lens 330 may be aspherical.

The fourth lens 340 may have negative refractive power. An object-side surface and an image-side surface of the fourth lens 340 may have a concave shape in the paraxial region. The fourth lens 340 may be formed of plastic. Specifically, the fourth lens 340 may be formed of a plastic material with optical properties (e.g., different refractive index and Abbe number) different from the third lens 330. The object-side surface and the image-side surface of the fourth lens 340 may be aspherical. Additionally, the image-side surface of the fourth lens 340 may include an inflection point. For example, the image-side surface of the fourth lens 340 may have a concave shape in the paraxial region and may have a convex shape in the peripheral region.

Table 5 illustrates optical and physical parameters of the optical imaging system 300 according to the third embodiment.

TABLE 5

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 4.311 | 2.400 | 1.497 | 81.6 | 2.86 |
| 3 | 392.098 | 1.629 | | | 2.49 |
| 4 | −9.924 | 0.981 | 1.614 | 25.9 | 1.90 |
| 5 | 8.130 | 1.000 | | | 1.72 |
| 6 | −14.833 | 0.950 | 1.661 | 20.4 | 1.88 |
| 7 | −6.254 | 0.600 | | | 1.81 |
| 8 | −16.745 | 0.950 | 1.544 | 56.0 | 1.74 |
| 9 | 82.133 | 9.587 | | | 1.86 |
| 10 | Infinity | 0.210 | 1.518 | 64.2 | 4.50 |
| 11 | Infinity | 1.000 | | | 4.50 |
| Image | Infinity | | | | 3.59 |

Table 6 illustrates aspheric data of the optical imaging system 300 according to the third

TABLE 6

| Surface | 2 | 3 | 4 | 5 | 6 | 7 | 8 | 9 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| A | 0.00E+00 | 0.00E+00 | −5.61E−03 | −7.15E−03 | −2.43E−03 | −3.52E−03 | −1.94E−02 | −1.45E−02 |
| B | 0.00E+00 | 0.00E+00 | 1.13E−03 | 1.16E−03 | −2.87E−04 | 5.77E−04 | 3.73E−04 | 2.30E−03 |
| C | 0.00E+00 | 0.00E+00 | −4.81E−04 | −1.13E−03 | −4.26E−04 | −2.01E−04 | 1.31E−03 | −6.65E−04 |
| D | 0.00E+00 | 0.00E+00 | 2.97E−04 | 8.57E−04 | 1.84E−04 | −6.22E−05 | −8.98E−04 | 1.41E−04 |
| E | 0.00E+00 | 0.00E+00 | −1.09E−04 | −3.42E−04 | −6.64E−05 | 3.80E−05 | 2.33E−04 | −1.63E−05 |
| F | 0.00E+00 | 0.00E+00 | 2.01E−05 | 6.64E−05 | 9.74E−06 | −1.61E−05 | −2.27E−05 | 6.94E−07 |
| G | 0.00E+00 | 0.00E+00 | −1.46E−06 | −4.86E−06 | 0.00E+00 | 4.85E−06 | 0.00E+00 | 0.00E+00 |
| H | 0.00E+00 | 0.00E+00 | 0.00E+00 | 0.00E+00 | 0.00E+00 | −7.21E−07 | 0.00E+00 | 0.00E+00 |
| J | 0.00E+00 | 0.00E+00 | 0.00E+00 | 0.00E+00 | 0.00E+00 | 4.10E−08 | 0.00E+00 | 0.00E+00 |
| L | 0.00E+00 | 0.00E+00 | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 | 0.00E+00 | 0.00E+00 |

Fourth Embodiment

Figure 4A:
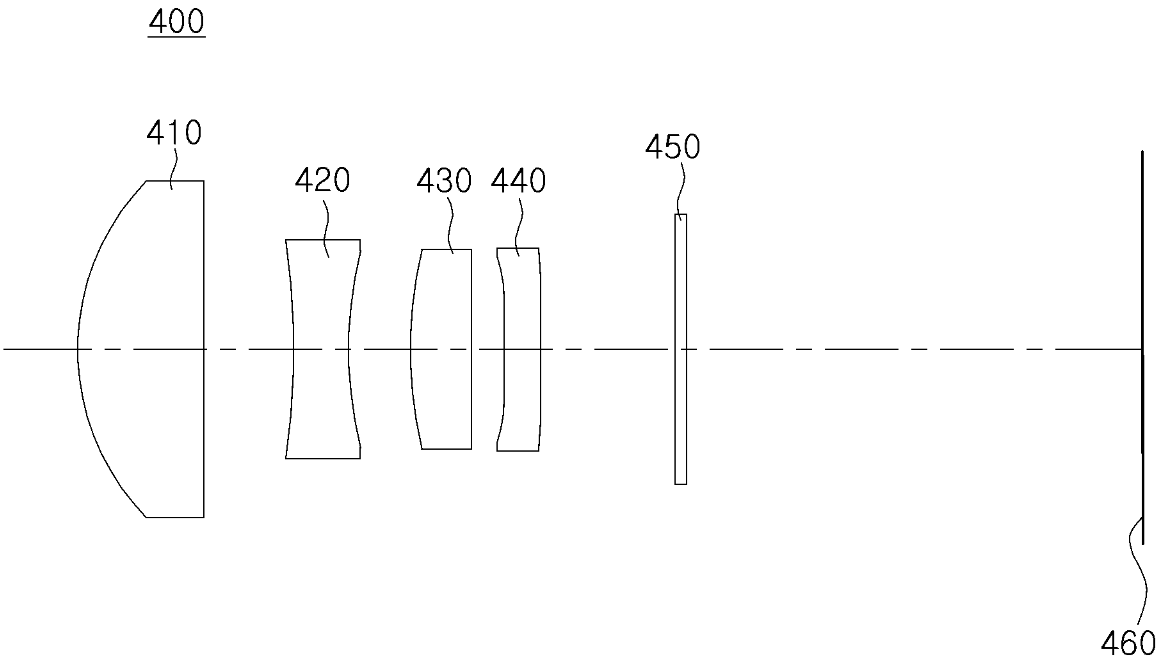
FIG. 4A illustrates an example optical imaging system according to a fourth embodiment.
Figure 4B:
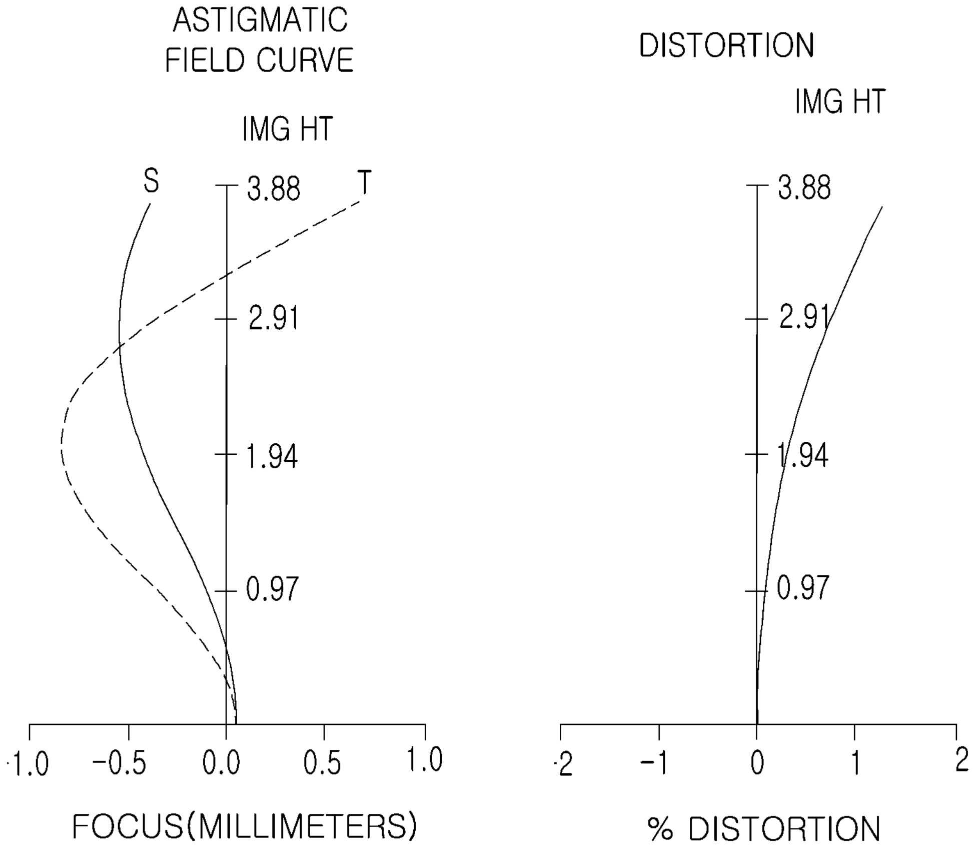
FIG. 4B is a graph illustrating aberration characteristics of the example optical imaging system according to the fourth embodiment.

FIG. 4A illustrates an example optical imaging system according to a fourth embodiment, and FIG. 4B is a graph illustrating aberration characteristics of an optical imaging system according to the fourth embodiment.

An optical imaging system 400 according to the fourth embodiment may include a first lens 410, a second lens 420, a third lens 430, and a fourth lens 440 arranged in order from an object side to an imaging plane, and may further include an infrared blocking filter 450 and an image sensor 460 on an image side of the fourth lens 440.

The first lens 410 may have positive refractive power. An object-side surface of the first lens 410 may have a convex shape in the paraxial region, and an image-side surface of the first lens 410 may be flat. The first lens 410 may be formed of glass. The object-side surface and the image-side surface of the first lens 410 may be spherical. The first lens 410 may be a D-cut lens. For example, a length of the first lens 410 in the first axis direction, perpendicular to the optical axis direction, may be longer than a length thereof in the second axis direction, perpendicular to both the optical axis direction and the first axis direction.

The second lens 420 may have negative refractive power. An object-side surface and an image-side surface of the second lens 420 may have a concave shape in the paraxial region. The second lens 420 may be formed of plastic. The object-side surface and the image-side surface of the second lens 420 may be aspherical.

The third lens 430 may have positive refractive power. An object-side surface and an image-side surface of the third lens 430 may have a convex shape in the paraxial region. The third lens 430 may be formed of plastic. Specifically, the third lens 430 may be formed of a plastic material with optical properties (e.g., different refractive index and Abbe number) different from the second lens 420. The object-side surface and the image-side surface of the third lens 430 may be aspherical.

The fourth lens 440 may have negative refractive power. An object-side surface of the fourth lens 440 may have a convex shape in the paraxial region, and an image-side surface of the fourth lens 440 may have a concave shape in the paraxial region. The fourth lens 440 may be formed of plastic. Specifically, the fourth lens 440 may be formed of a plastic material with optical properties (e.g., different refractive index and Abbe number) different from the third lens 430. The object-side surface and the image-side surface of the fourth lens 440 may be aspherical. Additionally, the image-side surface of the fourth lens 440 may include an inflection point. For example, the image-side surface of the fourth lens 440 may have a concave shape in the paraxial region and may have a convex shape in the peripheral region.

Table 7 illustrates optical and physical parameters of the optical imaging system 400 according to the fourth embodiment.

TABLE 7

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 4.536 | 2.300 | 1.497 | 81.6 | 2.88 |
| 3 | Infinity | 1.608 | | | 2.53 |
| 4 | −16.276 | 1.000 | 1.614 | 25.9 | 1.90 |
| 5 | 5.990 | 1.160 | | | 1.71 |
| 6 | 21.072 | 1.110 | 1.661 | 20.4 | 1.73 |
| 7 | −18.062 | 0.596 | | | 1.67 |
| 8 | 39.586 | 0.679 | 1.544 | 56.0 | 1.65 |
| 9 | 11.237 | 2.420 | | | 1.74 |
| 10 | Infinity | 0.210 | 1.518 | 64.2 | 2.23 |
| 11 | Infinity | 8.226 | | | 2.25 |
| Image | Infinity | | | | 3.89 |

Table 8 illustrates aspheric data of the optical imaging system 400 according to the fourth

TABLE 8

| Surface | 2 | 3 | 4 | 5 | 6 | 7 | 8 | 9 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| A | 0.00E+00 | 0.00E+00 | −6.61E−03 | −6.32E−03 | 3.98E−03 | −3.09E−03 | −3.44E−02 | −2.74E−02 |
| B | 0.00E+00 | 0.00E+00 | 1.62E−03 | 2.11E−03 | 7.03E−03 | 1.46E−02 | 1.15E−02 | 7.53E−03 |
| C | 0.00E+00 | 0.00E+00 | −7.11E−04 | −1.11E−03 | −8.61E−03 | −1.79E−02 | −8.19E−03 | −4.40E−03 |
| D | 0.00E+00 | 0.00E+00 | 3.21E−04 | 7.39E−04 | 8.09E−03 | 1.72E−02 | 5.25E−03 | 2.40E−03 |
| E | 0.00E+00 | 0.00E+00 | −9.62E−05 | −3.41E−04 | −5.06E−03 | −1.11E−02 | −2.12E−03 | −8.56E−04 |
| F | 0.00E+00 | 0.00E+00 | 1.63E−05 | 8.33E−05 | 2.06E−03 | 4.71E−03 | 4.39E−04 | 1.64E−04 |
| G | 0.00E+00 | 0.00E+00 | −1.15E−06 | −7.96E−06 | −5.29E−04 | −1.28E−03 | −3.44E−05 | −1.72E−05 |
| H | 0.00E+00 | 0.00E+00 | 0.00E+00 | 0.00E+00 | 7.81E−05 | 2.03E−04 | 0.00E+00 | 0.00E+00 |
| J | 0.00E+00 | 0.00E+00 | 0.00E+00 | 0.00E+00 | −5.05E−06 | −1.40E−05 | 0.00E+00 | 0.00E+00 |
| L | 0.00E+00 | 0.00E+00 | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 | 0.00E+00 | 0.00E+00 |

Fifth Embodiment

Figure 5A:
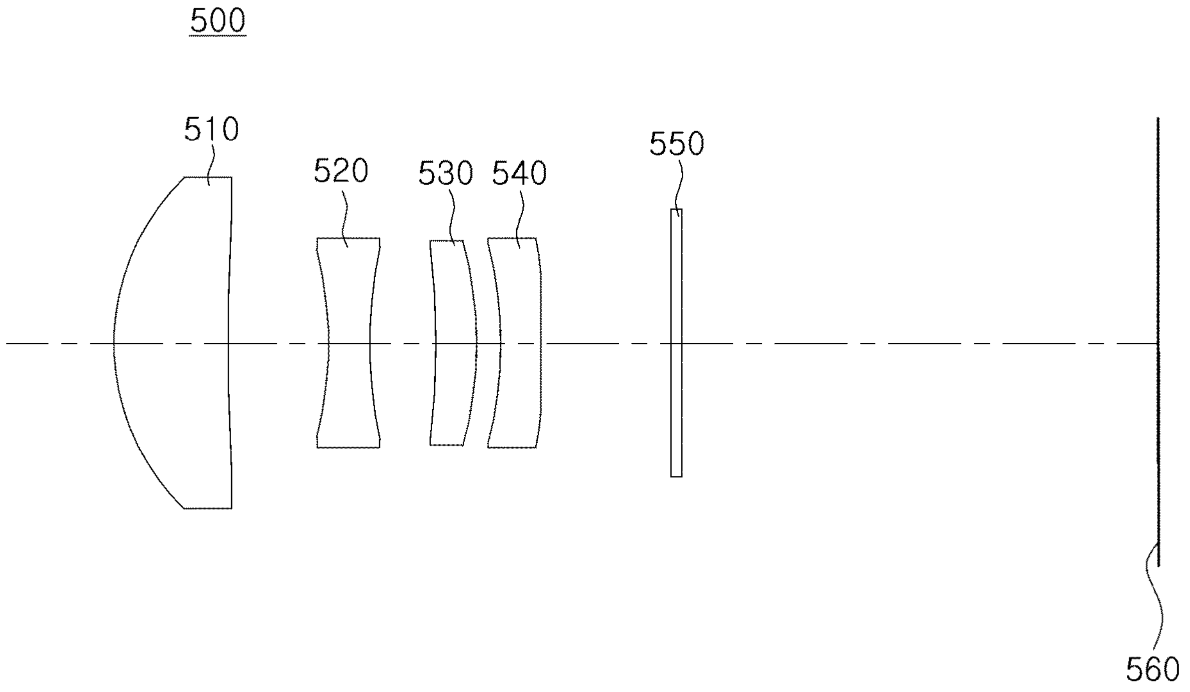
FIG. 5A illustrates an example optical imaging system according to a fifth embodiment.
Figure 5B:
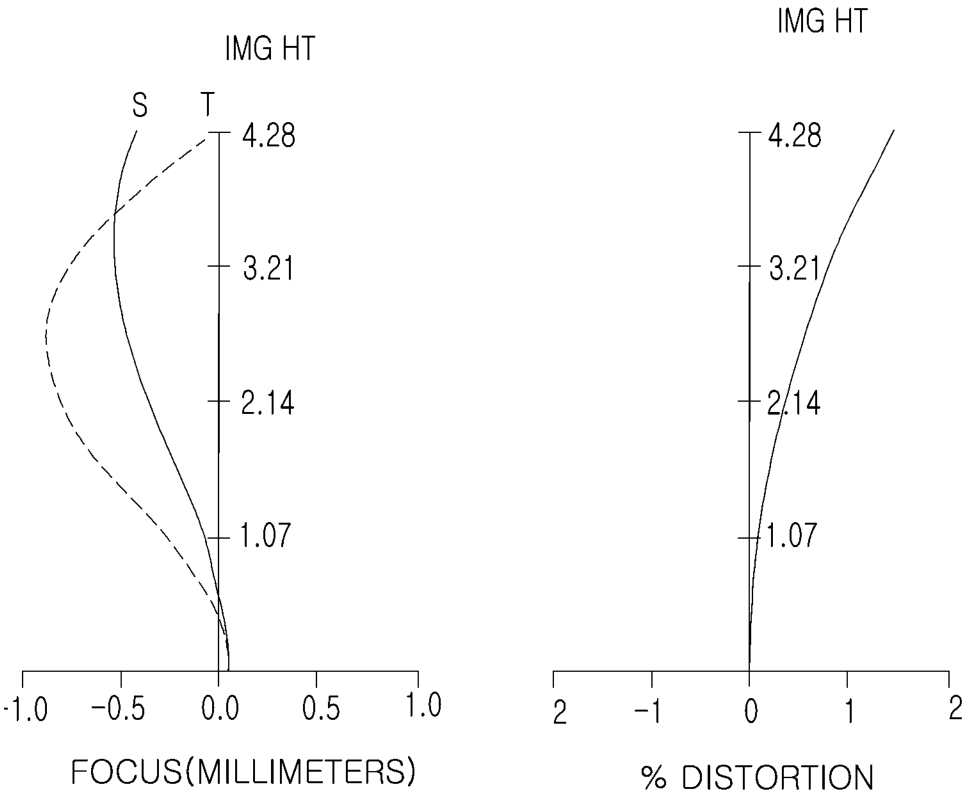
FIG. 5B is a graph illustrating aberration characteristics of the example optical imaging system according to the fifth embodiment.

FIG. 5A illustrates an example optical imaging system according to a fifth embodiment, and FIG. 5B is a graph illustrating aberration characteristics of an optical imaging system according to the fifth embodiment.

An optical imaging system 500 according to the fifth embodiment may include a first lens 510, a second lens 520, a third lens 530, and a fourth lens 540 arranged in order from an object side to an imaging plane, may include an infrared blocking filter 550 and an image sensor 560 on an image side of the fourth lens 540.

The first lens 510 may have positive refractive power. An object-side surface of the first lens 510 may have a convex shape in the paraxial region, and an image-side surface of the first lens 510 may have a concave shape in the paraxial region. The first lens 510 may be formed of glass. The object-side surface and the image-side surface of the first lens 510 may be spherical. The first lens 510 may be a D-cut lens. For example, a length of the first lens 510 in the first axis direction, perpendicular to the optical axis direction, may be longer than a length thereof in the second axis direction, perpendicular to both the optical axis direction and the first axis direction.

The second lens 520 may have negative refractive power. An object-side surface and an image-side surface of the second lens 520 may have a concave shape in the paraxial region. The second lens 520 may be formed of plastic. The object-side surface and the image-side surface of the second lens 520 may be aspherical.

TABLE 9

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 4.252 | 2.156 | 1.497 | 81.6 | 2.85 |
| 3 | 77.008 | 1.842 | | | 2.54 |
| 4 | −7.713 | 0.761 | 1.614 | 25.9 | 1.90 |
| 5 | 10.048 | 1.200 | | | 1.75 |
| 6 | −22.057 | 0.800 | 1.661 | 20.4 | 1.79 |
| 7 | −7.140 | 0.400 | | | 1.84 |
| 8 | 49.525 | 0.730 | 1.544 | 56.0 | 1.81 |
| 9 | 12.919 | 2.420 | | | 1.90 |
| 10 | Infinity | 0.210 | 1.518 | 64.2 | 2.42 |
| 11 | Infinity | 8.790 | | | 2.45 |
| Image | Infinity | | | | 4.28 |

Table 10 illustrates aspheric data of the optical imaging system 500 according to the fifth

TABLE 10

| Surface | 2 | 3 | 4 | 5 | 6 | 7 | 8 | 9 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| A | 0.00E+00 | 0.00E+00 | −2.73E−03 | −2.28E−03 | 3.19E−03 | −5.46E−04 | −2.52E−02 | −2.12E−02 |
| B | 0.00E+00 | 0.00E+00 | 1.33E−03 | 1.36E−03 | −4.67E−04 | 9.46E−04 | 1.51E−03 | 3.10E−03 |
| C | 0.00E+00 | 0.00E+00 | −6.36E−04 | −1.18E−03 | −3.20E−04 | −4.63E−04 | 9.73E−04 | −7.30E−04 |
| D | 0.00E+00 | 0.00E+00 | 3.27E−04 | 8.58E−04 | 1.58E−04 | −3.22E−05 | −8.37E−04 | 1.48E−04 |
| E | 0.00E+00 | 0.00E+00 | −1.11E−04 | −3.42E−04 | −6.64E−05 | 3.80E−05 | 2.33E−04 | −1.63E−05 |
| F | 0.00E+00 | 0.00E+00 | 2.01E−05 | 6.64E−05 | 9.74E−06 | −1.61E−05 | −2.27E−05 | 6.94E−07 |
| G | 0.00E+00 | 0.00E+00 | −1.46E−06 | −4.86E−06 | 0.00E+00 | 4.85E−06 | 0.00E+00 | 0.00E+00 |
| H | 0.00E+00 | 0.00E+00 | 0.00E+00 | 0.00E+00 | 0.00E+00 | −7.21E−07 | 0.00E+00 | 0.00E+00 |
| J | 0.00E+00 | 0.00E+00 | 0.00E+00 | 0.00E+00 | 0.00E+00 | 4.10E−08 | 0.00E+00 | 0.00E+00 |
| L | 0.00E+00 | 0.00E+00 | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 | 0.00E+00 | 0.00E+00 |

The third lens 530 may have positive refractive power. An object-side surface of the third lens 530 may have a concave shape in the paraxial region, and an image-side surface of the third lens 530 may have a convex shape in the paraxial region. The third lens 530 may be formed of plastic. Specifically, the third lens 530 may be formed of a plastic material with optical properties (e.g., different refractive index and Abbe number) different from the second lens 520. The object-side surface and the image-side surface of the third lens 530 may be aspherical.

The fourth lens 540 may have negative refractive power. An object-side surface of the fourth lens 540 may have a convex shape in the paraxial region, and an image-side surface of the fourth lens 540 may have a concave shape in the paraxial region. The fourth lens 540 may be formed of plastic. Specifically, the fourth lens 540 may be formed of a plastic material with optical properties (e.g., different refractive index and Abbe number) different from the third lens 530. The object-side surface and the image-side surface of the fourth lens 540 may be aspherical. Additionally, the image-side surface of the fourth lens 540 may include an inflection point. For example, the image-side surface of the fourth lens 540 may have a concave shape in the paraxial region and may have a convex shape in the peripheral region.

Table 9 illustrates optical and physical parameters of the optical imaging system 500 according to the fifth embodiment.

Sixth Embodiment

Figure 6A:
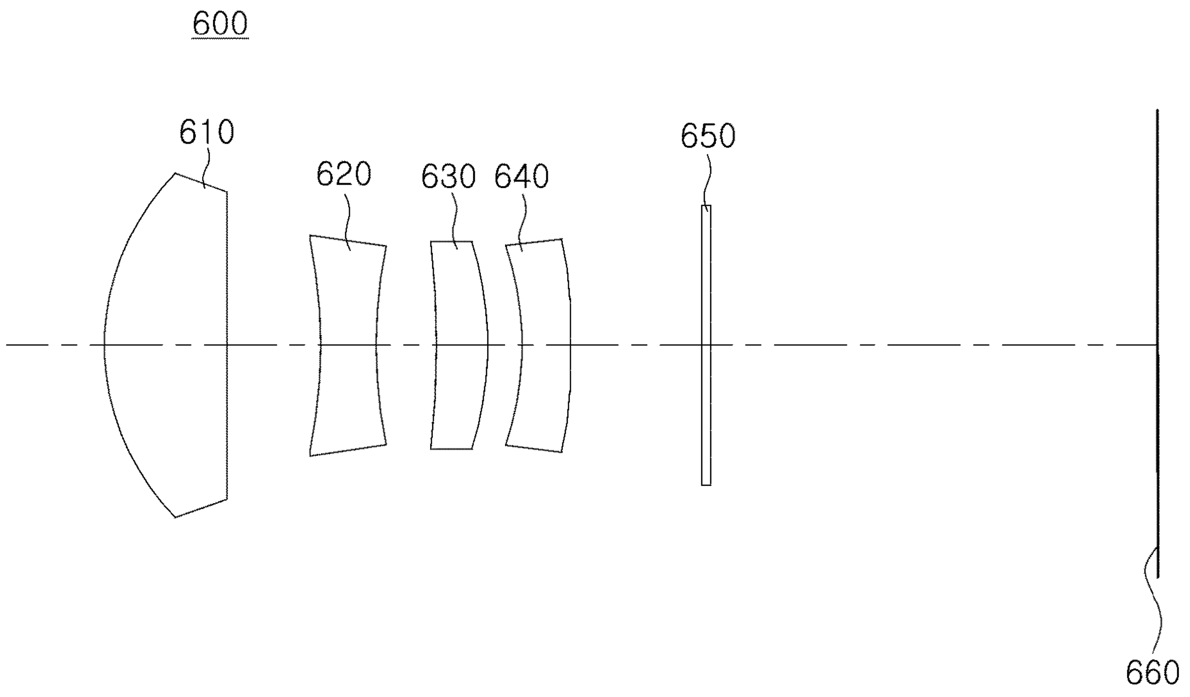
FIG. 6A illustrates an example optical imaging system according to a sixth embodiment.
Figure 6B:
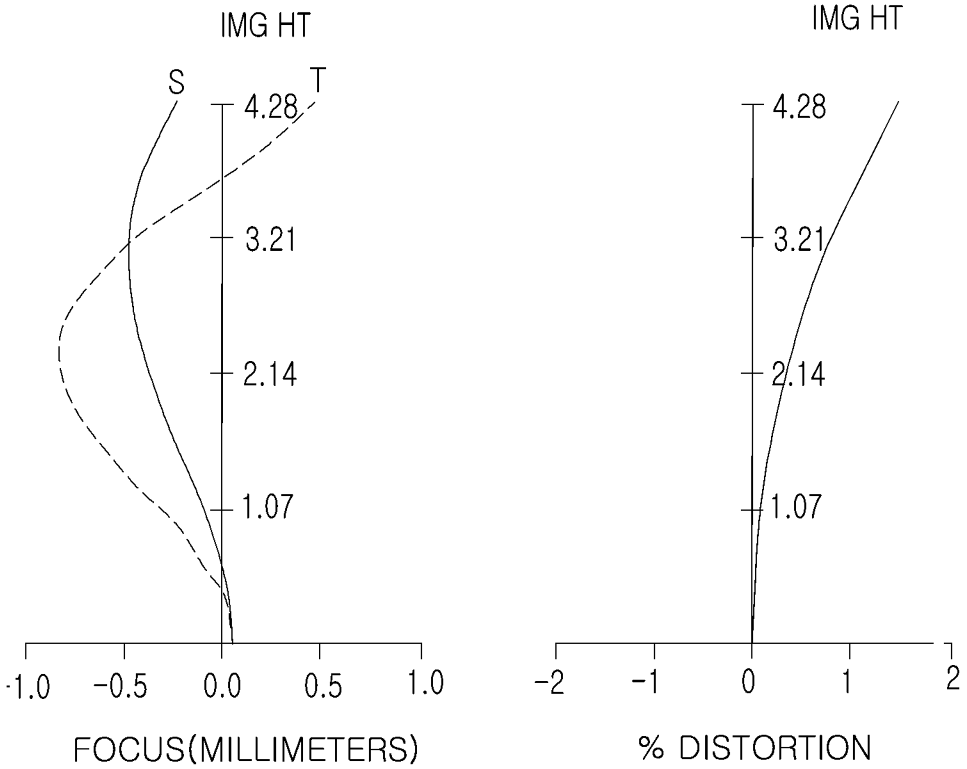
FIG. 6B is a graph illustrating aberration characteristics of the example optical imaging system according to the sixth embodiment.

FIG. 6A illustrates an example optical imaging system according to a sixth embodiment, and FIG. 6B is a graph illustrating aberration characteristics of an optical imaging system according to the sixth embodiment.

An optical imaging system 600 according to the sixth embodiment may include a first lens 610, a second lens 620, a third lens 630, and a fourth lens 640 arranged in order from an object side, may include an infrared blocking filter 650 and an image sensor 660 on an image side of the fourth lens 640.

The first lens 610 may have positive refractive power. An object-side surface of the first lens 610 may have a convex shape in the paraxial region, and an image-side surface of the first lens 610 may have a concave shape in the paraxial region. The first lens 610 may be formed of glass. The object-side surface and the image-side surface of the first lens 610 may be spherical. The first lens 610 may be a D-cut lens. For example, a length of the first lens 610 in the first axis direction, perpendicular to the optical axis direction, may be longer than a length thereof in the second axis direction, perpendicular to both the optical axis direction and the first axis direction.

The second lens 620 may have negative refractive power. An object-side surface and an image-side surface of the second lens 620 may have a concave shape in the paraxial region. The second lens 620 may be formed of plastic. The object-side surface and the image-side surface of the second lens 620 may be aspherical.

The third lens 630 may have positive refractive power. An object-side surface of the third lens 630 may have a concave shape in the paraxial region, and an image-side surface of the third lens 630 may have a convex shape in the paraxial region. The third lens 630 may be formed of plastic. Specifically, the third lens 630 may be formed of a plastic material with optical properties (e.g., different refractive index and Abbe number) different from the second lens 620. The object-side surface and the image-side surface of the third lens 630 may be aspherical.

The fourth lens 640 may have negative refractive power. An object-side surface and an image-side surface of the fourth lens 640 may have a concave shape in the paraxial region. The fourth lens 640 may be formed of plastic. In detail, the fourth lens 640 may be formed of a plastic material with optical properties (e.g., different refractive index and Abbe number) different from the third lens 630. The object-side surface and the image-side surface of the fourth lens 640 may be aspherical. Additionally, the image-side surface of the fourth lens 640 may include an inflection point. For example, the image-side surface of the fourth lens 640 may have a concave shape in the paraxial region and may have a convex shape in the peripheral region.

Table 11 illustrates optical and physical parameters of the optical imaging system 600 according to the sixth embodiment.

TABLE 11

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 4.359 | 2.270 | 1.497 | 81.6 | 2.85 |
| 3 | 260.033 | 1.723 | | | 2.52 |
| 4 | −12.128 | 0.997 | 1.614 | 25.9 | 1.90 |
| 5 | 7.038 | 1.100 | | | 1.71 |
| 6 | −20.183 | 0.950 | 1.661 | 20.4 | 1.88 |
| 7 | −6.962 | 0.600 | | | 1.79 |
| 8 | −18.758 | 0.870 | 1.544 | 56.0 | 1.73 |
| 9 | 73.509 | 2.420 | | | 1.86 |
| 10 | Infinity | 0.210 | 1.518 | 64.2 | 2.43 |
| 11 | Infinity | 8.170 | | | 2.46 |
| Image | Infinity | | | | 4.28 |

Table 12 illustrates aspheric data of the optical imaging system 600 according to the sixth

TABLE 12

| Surface | 2 | 3 | 4 | 5 | 6 | 7 | 8 | 9 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| A | 0.00E+00 | 0.00E+00 | −6.28E−03 | −7.15E−03 | −1.23E−04 | −2.15E−03 | −2.02E−02 | −1.57E−02 |
| B | 0.00E+00 | 0.00E+00 | 1.16E−03 | 1.47E−03 | 1.85E−04 | 8.24E−04 | 2.59E−04 | 2.25E−03 |
| C | 0.00E+00 | 0.00E+00 | −4.79E−04 | −1.15E−03 | −3.72E−04 | −2.27E−04 | 1.26E−03 | −6.55E−04 |
| D | 0.00E+00 | 0.00E+00 | 2.96E−04 | 8.62E−04 | 1.89E−04 | −5.01E−05 | −8.82E−04 | 1.42E−04 |
| E | 0.00E+00 | 0.00E+00 | −1.08E−04 | −3.42E−04 | −6.64E−05 | 3.80E−05 | 2.33E−04 | −1.63E−05 |
| F | 0.00E+00 | 0.00E+00 | 2.01E−05 | 6.64E−05 | 9.74E−06 | −1.61E−05 | −2.27E−05 | 6.94E−07 |
| G | 0.00E+00 | 0.00E+00 | −1.46E−06 | −4.86E−06 | 0.00E+00 | 4.85E−06 | 0.00E+00 | 0.00E+00 |
| H | 0.00E+00 | 0.00E+00 | 0.00E+00 | 0.00E+00 | 0.00E+00 | −7.21E−07 | 0.00E+00 | 0.00E+00 |
| J | 0.00E+00 | 0.00E+00 | 0.00E+00 | 0.00E+00 | 0.00E+00 | 4.10E−08 | 0.00E+00 | 0.00E+00 |
| L | 0.00E+00 | 0.00E+00 | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 | 0.00E+00 | 0.00E+00 |

Seventh Embodiment

Figure 7A:
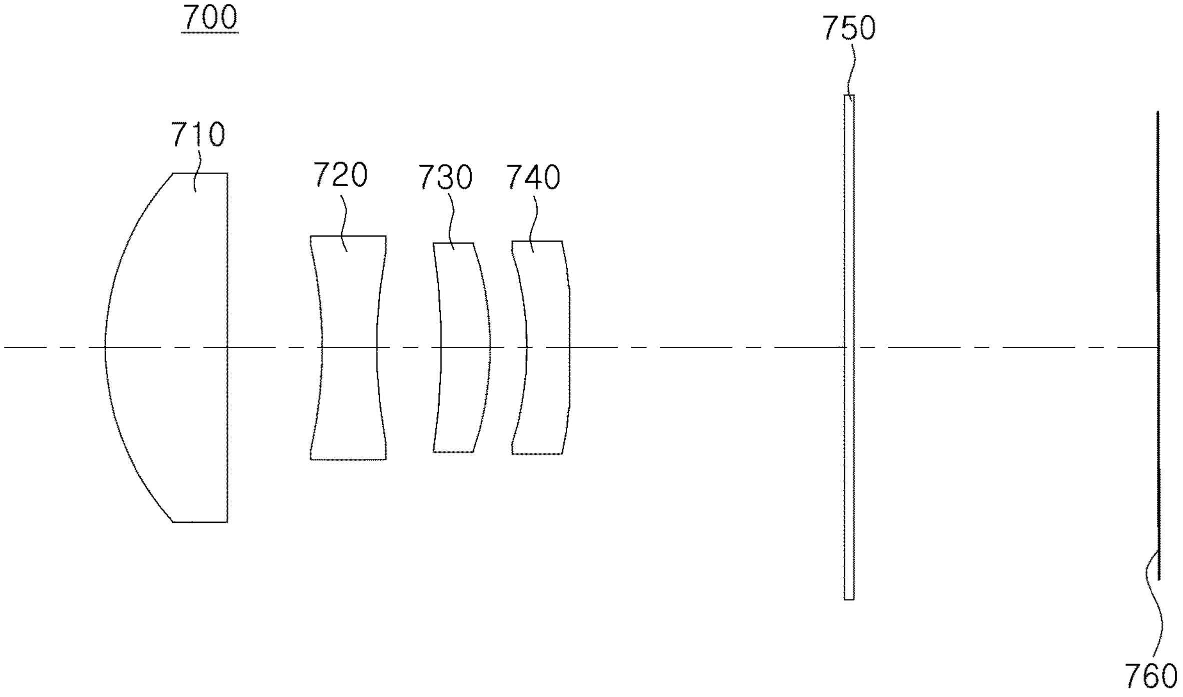
FIG. 7A illustrates an example optical imaging system according to a seventh embodiment.
Figure 7B:
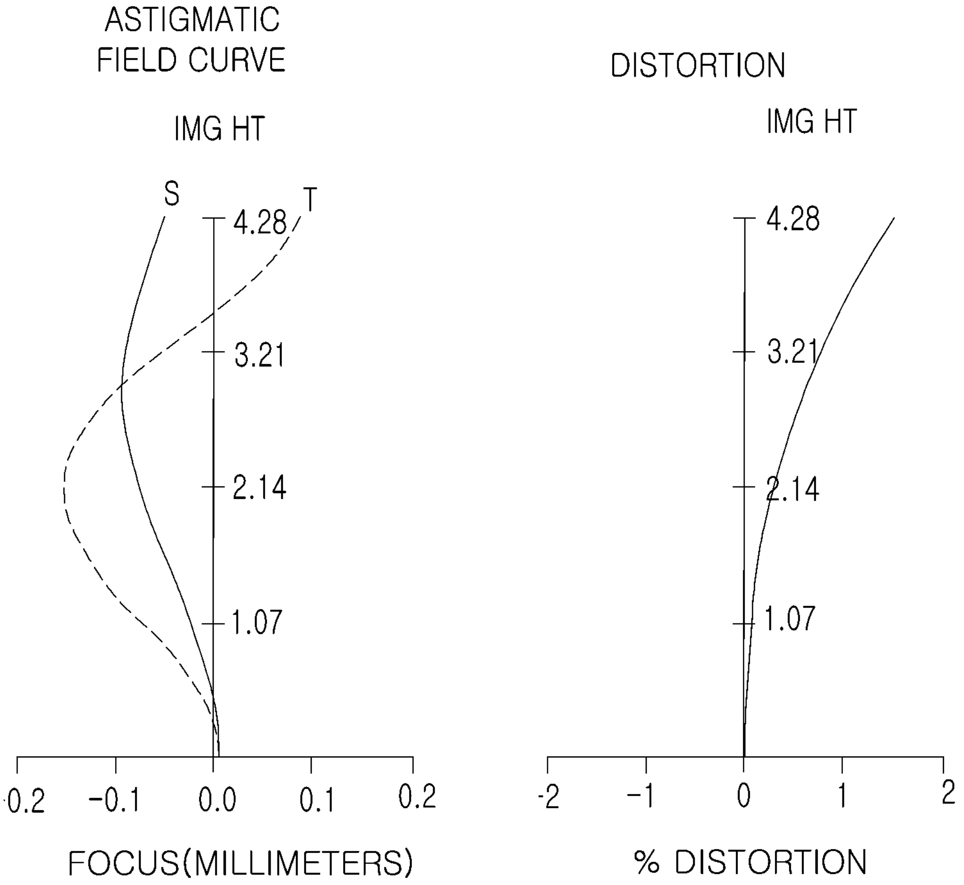
FIG. 7B is a graph illustrating aberration characteristics of the example optical imaging system according to the seventh embodiment.

FIG. 7A illustrates an example optical imaging system according to a seventh embodiment, and FIG. 7B is a graph illustrating aberration characteristics of an optical imaging system according to the seventh embodiment.

An optical imaging system 700 according to the seventh embodiment may include a first lens 710, a second lens 720, a third lens 730, and a fourth lens 740 arranged in order from an object side to an imaging plane, and may further include an infrared blocking filter 750 and an image sensor 760 in an image side of the fourth lens 740.

The first lens 710 may have positive refractive power. An object-side surface of the first lens 710 may have a convex shape in the paraxial region, and an image-side surface of the first lens 710 may have a concave shape in the paraxial region. The first lens 710 may be formed of glass. The object-side surface and the image-side surface of the first lens 710 may be spherical. The first lens 710 may be a D-cut lens. For example, a length of the first lens 710 in the first axis direction, perpendicular to the optical axis direction, may be longer than a length thereof in the second axis direction, perpendicular to both the optical axis direction and the first axis direction.

The second lens 720 may have negative refractive power. An object-side surface and an image-side surface of the second lens 720 may have a concave shape in the paraxial region. The second lens 70 may be formed of plastic. The object-side surface and the image-side surface of the second lens 720 may be aspherical.

The third lens 730 may have positive refractive power. An object-side surface of the third lens 730 may have a concave shape in the paraxial region, and an image-side surface of the third lens 730 may have a convex shape in the paraxial region. The third lens 730 may be formed of plastic. Specifically, the third lens 730 may be formed of a plastic material with optical properties (e.g., different refractive index and Abbe number) different from the second lens 720. The object-side surface and the image-side surface of the third lens 730 may be aspherical.

The fourth lens 740 may have negative refractive power. An object-side surface and an image-side surface of the fourth lens 740 may have a concave shape in the paraxial region. The fourth lens 740 may be formed of plastic. Specifically, the fourth lens 740 may be formed of a plastic material with optical properties (e.g., different refractive index and Abbe number) different from the third lens 730. The object-side surface and the image-side surface of the fourth lens 740 may be aspherical. Additionally, the image-side surface of the fourth lens 740 may include an inflection point. For example, the image-side surface of the fourth lens 740 may have a concave shape in the paraxial region and may have a convex shape in the peripheral region.

Table 13 illustrates optical and physical parameters of the optical imaging system 700 according to the seventh embodiment.

TABLE 13

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 4.389 | 2.270 | 1.497 | 81.6 | 2.85 |
| 3 | 373.620 | 1.735 | | | 2.53 |
| 4 | −11.879 | 0.988 | 1.615 | 26.0 | 1.90 |
| 5 | 7.139 | 1.150 | | | 1.71 |
| 6 | −16.901 | 0.916 | 1.661 | 20.4 | 1.72 |
| 7 | −6.454 | 0.650 | | | 1.78 |
| 8 | −21.860 | 0.800 | 1.544 | 56.0 | 1.69 |
| 9 | 42.575 | 5.000 | | | 1.78 |
| 10 | Infinity | 0.210 | 1.518 | 64.2 | 4.50 |
| 11 | Infinity | 5.590 | | | 4.50 |
| Image | Infinity | | | | 4.28 |

Table 14 illustrates aspheric data of the optical imaging system 700 according to the seventh embodiment.

TABLE 14

| Surface | 2 | 3 | 4 | 5 | 6 | 7 | 8 | 9 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| A | 0.00E+00 | 0.00E+00 | −6.12E−03 | −6.78E−03 | −2.26E−03 | −4.14E−03 | −1.98E−02 | −1.66E−02 |
| B | 0.00E+00 | 0.00E+00 | 1.17E−03 | 1.36E−03 | 4.36E−03 | 1.01E−02 | 3.97E−03 | 4.24E−03 |
| C | 0.00E+00 | 0.00E+00 | −5.02E−04 | −1.17E−03 | −4.53E−03 | −1.43E−02 | −1.91E−03 | −2.20E−03 |
| D | 0.00E+00 | 0.00E+00 | 2.97E−04 | 8.46E−04 | 2.05E−03 | 1.32E−02 | 3.77E−04 | 7.53E−04 |
| E | 0.00E+00 | 0.00E+00 | −1.07E−04 | −3.44E−04 | −5.20E−04 | −8.53E−03 | −4.88E−05 | −1.47E−04 |
| F | 0.00E+00 | 0.00E+00 | 2.01E−05 | 7.05E−05 | 5.74E−05 | 3.62E−03 | 6.38E−06 | 1.25E−05 |
| G | 0.00E+00 | 0.00E+00 | −1.48E−06 | −5.47E−06 | 0.00E+00 | −9.54E−04 | 0.00E+00 | 0.00E+00 |
| H | 0.00E+00 | 0.00E+00 | 0.00E+00 | 0.00E+00 | 0.00E+00 | 1.42E−04 | 0.00E+00 | 0.00E+00 |
| J | 0.00E+00 | 0.00E+00 | 0.00E+00 | 0.00E+00 | 0.00E+00 | −9.02E−06 | 0.00E+00 | 0.00E+00 |
| L | 0.00E+00 | 0.00E+00 | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 | 0.00E+00 | 0.00E+00 |

Eighth Embodiment

Figure 8A:
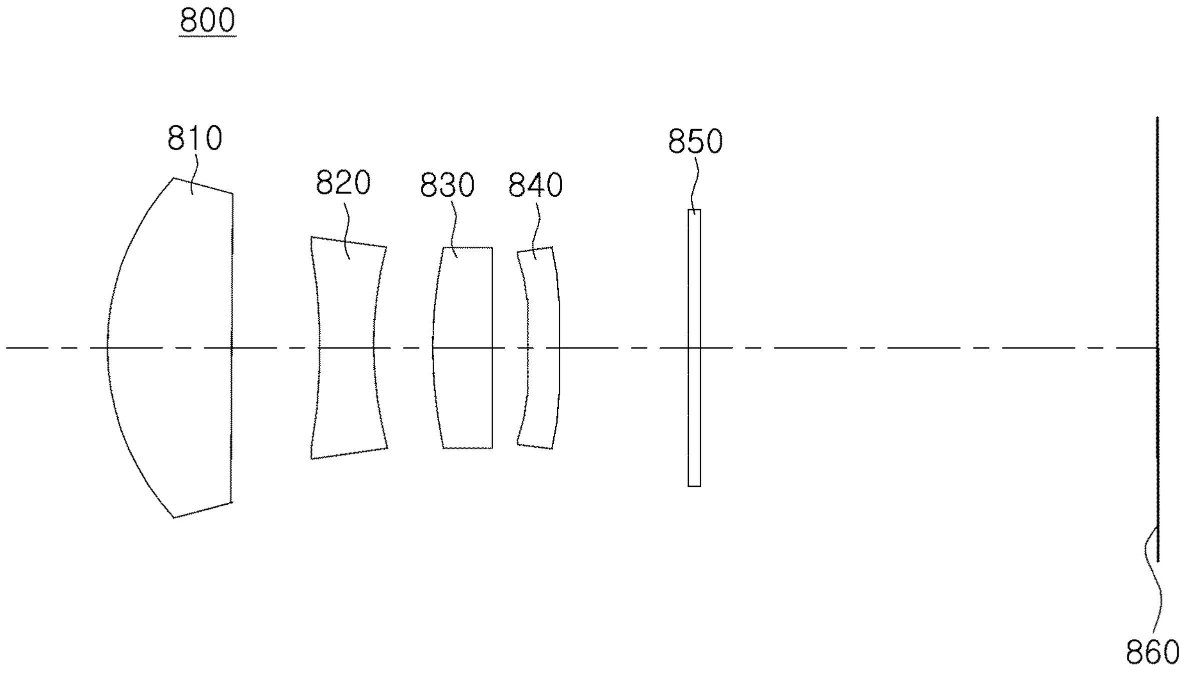
FIG. 8A illustrates an example optical imaging system according to an eighth embodiment.
Figure 8B:
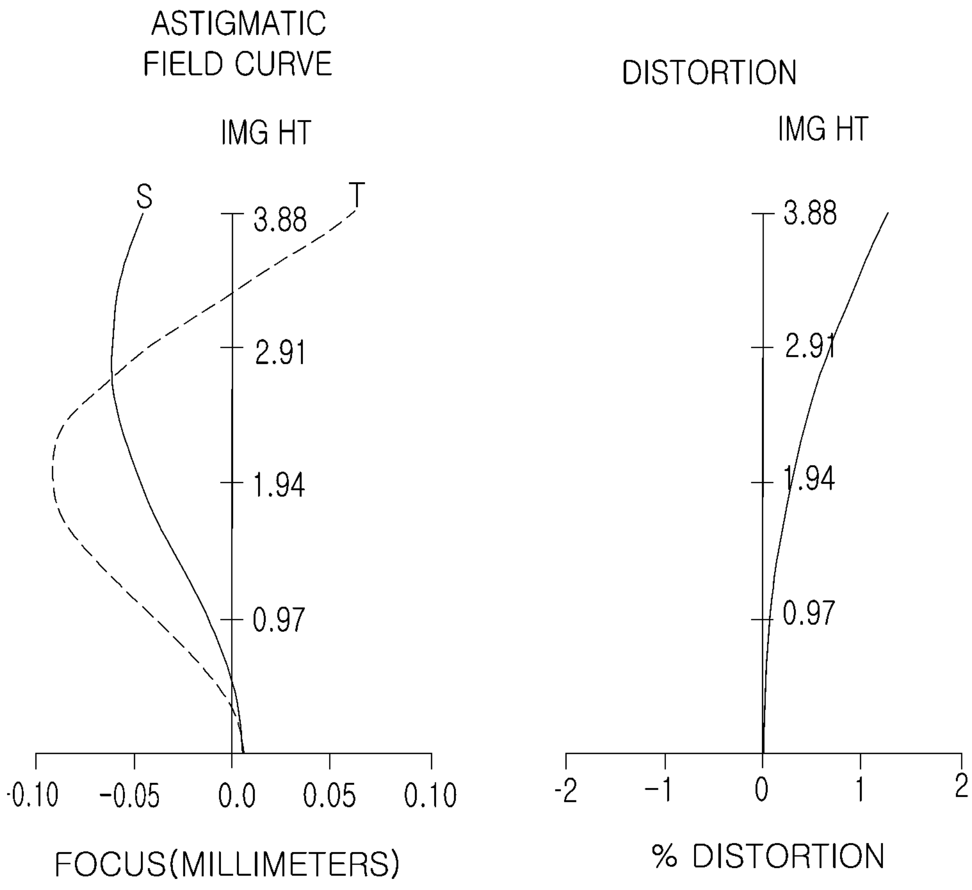
FIG. 8B is a graph illustrating aberration characteristics of the example optical imaging system according to the eighth embodiment.

FIG. 8A illustrates an example optical imaging system according to an eighth embodiment, and FIG. 8B is a graph illustrating aberration characteristics of an optical imaging system according to the eighth embodiment.

An optical imaging system 800 according to the eighth embodiment may include a first lens 810, a second lens 820, a third lens 830, and a fourth lens 840 arranged in order from an object side to an imaging plane, may further include an infrared blocking filter 850 and an image sensor 860 on an image side of the fourth lens 840.

The first lens 810 may have positive refractive power. An object-side surface of the first lens 810 may have a convex shape in the paraxial region, and an image-side surface of the first lens 810 may be flat. The first lens 810 may be formed of glass. The object-side surface and the image-side surface of the first lens 810 may be spherical. The first lens 810 may be a D-cut lens. For example, a length of the first lens 810 in the first axis direction, perpendicular to the optical axis direction, may be longer than a length thereof in the second axis direction, perpendicular to both the optical axis direction and the first axis direction.

The second lens 820 may have negative refractive power. An object-side surface and an image-side surface of the second lens 820 may have a concave shape in the paraxial region. The second lens 820 may be formed of plastic. The object-side surface and the image-side surface of the second lens 820 may be aspherical.

The third lens 830 may have positive refractive power. An object-side surface and an image-side surface of the third lens 830 may have a convex shape in the paraxial region. The third lens 830 may be formed of plastic. Specifically, the third lens 830 may be formed of a plastic material with optical properties (e.g., different refractive index and Abbe number) different from the second lens 820. The object-side surface and the image-side surface of the third lens 830 may be aspherical.

The fourth lens 840 may have negative refractive power. The object-side surface and the image-side surface of the fourth lens 840 may have a concave shape in the paraxial region. The fourth lens 840 may be formed of plastic. Specifically, the fourth lens 840 may be formed of a plastic material with optical properties (e.g., different refractive index and Abbe number) different from the third lens 830. The object-side surface and the image-side surface of the fourth lens 840 may be aspherical. Additionally, the image-side surface of the fourth lens 840 may include an inflection point. For example, the image-side surface of the fourth lens 840 may have a concave shape in the paraxial region and may have a convex shape in the peripheral region.

Table 15 illustrates optical and physical parameters of the optical imaging system 800 according to the eighth embodiment.

TABLE 15

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 4.514 | 2.300 | 1.497 | 81.6 | 2.90 |
| 3 | Infinity | 1.596 | | | 2.54 |
| 4 | −16.540 | 1.000 | 1.615 | 26.0 | 1.90 |
| 5 | 5.823 | 1.100 | | | 1.71 |
| 6 | 20.758 | 1.100 | 1.661 | 20.4 | 1.73 |
| 7 | −17.003 | 0.650 | | | 1.66 |
| 8 | −88.913 | 0.555 | 1.544 | 56.0 | 1.65 |
| 9 | 18.849 | 2.420 | | | 1.74 |

TABLE 15-continued

| Surface | Radius | Thickness/ Distance | Index | Abbe number | Semi-Aperture |
|---|---|---|---|---|---|
| 10 | Infinity | 0.210 | 1.518 | 64.2 | 2.23 |
| 11 | Infinity | 8.375 | | | 2.26 |
| Image | Infinity | | | | 3.89 |

Table 16 illustrates aspheric data of the optical imaging system 800 according to the eighth embodiment.

TABLE 16

| Surface | 2 | 3 | 4 | 5 | 6 | 7 | 8 | 9 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| A | 0.00E+00 | 0.00E+00 | −6.85E−03 | −6.68E−03 | 3.69E−03 | −1.07E−03 | −3.43E−02 | −2.92E−02 |
| B | 0.00E+00 | 0.00E+00 | 1.61E−03 | 1.98E−03 | 8.64E−03 | 1.46E−02 | 1.12E−02 | 8.89E−03 |
| C | 0.00E+00 | 0.00E+00 | −7.12E−04 | −1.11E−03 | −1.23E−02 | −2.09E−02 | −8.60E−03 | −6.12E−03 |
| D | 0.00E+00 | 0.00E+00 | 3.23E−04 | 7.46E−04 | 1.22E−02 | 2.16E−02 | 4.72E−03 | 3.26E−03 |
| E | 0.00E+00 | 0.00E+00 | −9.57E−05 | −3.38E−04 | −7.95E−03 | −1.50E−02 | −1.49E−03 | −1.05E−03 |
| F | 0.00E+00 | 0.00E+00 | 1.61E−05 | 8.38E−05 | 3.38E−03 | 6.94E−03 | 2.19E−04 | 1.79E−04 |
| G | 0.00E+00 | 0.00E+00 | −1.17E−06 | −8.36E−06 | −9.02E−04 | −2.04E−03 | −7.48E−06 | −1.22E−05 |
| H | 0.00E+00 | 0.00E+00 | 0.00E+00 | 0.00E+00 | 1.38E−04 | 3.42E−04 | 0.00E+00 | 0.00E+00 |
| J | 0.00E+00 | 0.00E+00 | 0.00E+00 | 0.00E+00 | −9.13E−06 | −2.46E−05 | 0.00E+00 | 0.00E+00 |
| L | 0.00E+00 | 0.00E+00 | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 | 0.00E+00 | 0.00E+00 |

Ninth Embodiment

Figure 9A:
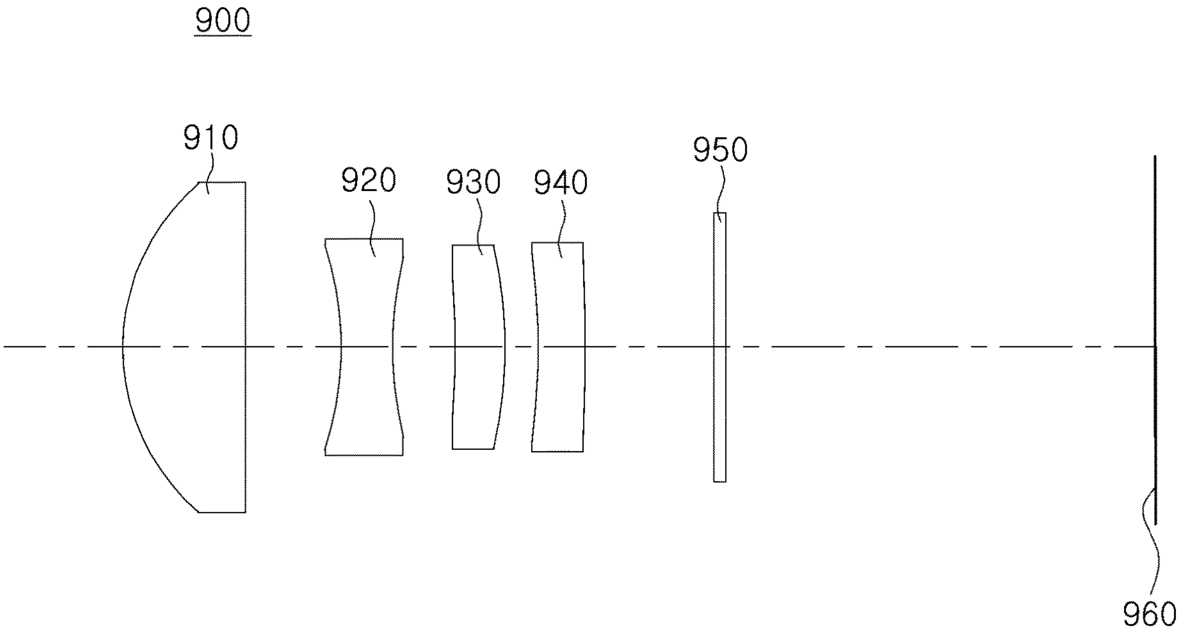
FIG. 9A illustrates an example optical imaging system according to a ninth embodiment.
Figure 9B:
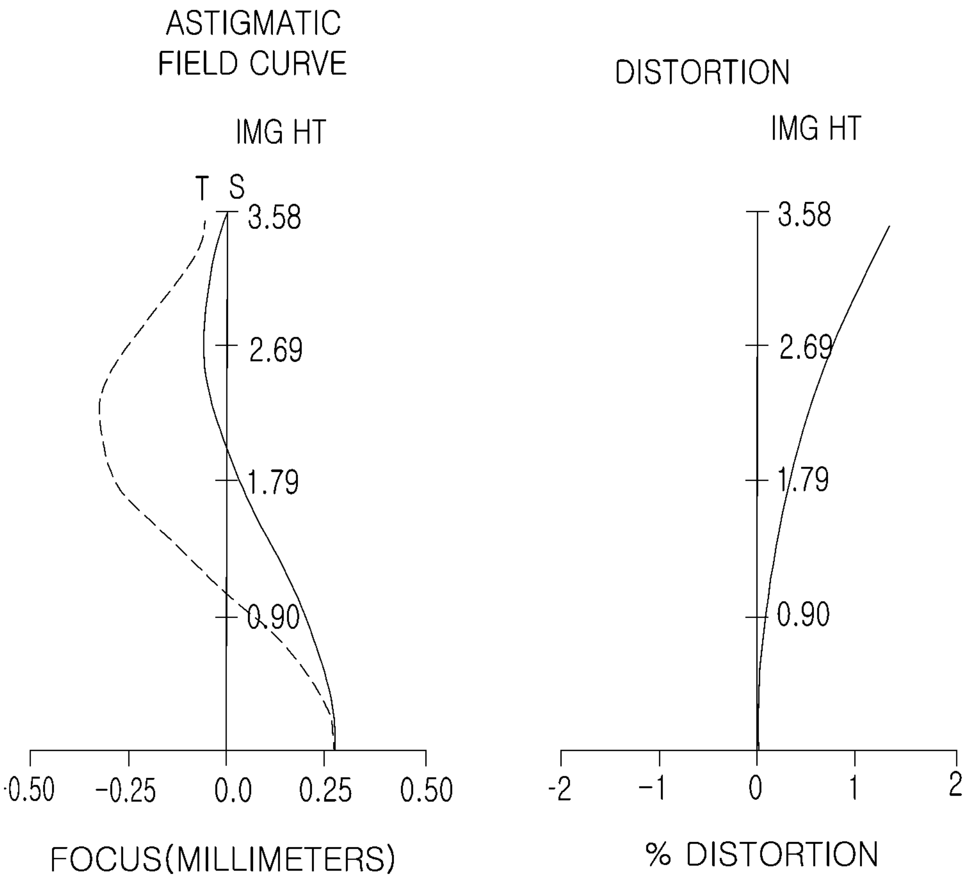
FIG. 9B is a graph illustrating aberration characteristics of the example optical imaging system according to the ninth embodiment.

FIG. 9A illustrates an example optical imaging system according to a ninth embodiment, and FIG. 9B is a graph illustrating aberration characteristics of an optical imaging system according to the ninth embodiment.

An optical imaging system 900 according to the ninth embodiment may include a first lens 910, a second lens 920, a third lens 930, and a fourth lens 940 arranged in order from the object side to the imaging plane, and may further include an infrared blocking filter 950 and an image sensor 960 in an image side of the fourth lens 940.

The first lens 910 may have positive refractive power. An object-side surface of the first lens 910 may have a convex shape in the paraxial region, and an image-side surface of the first lens 910 may have a concave shape. The first lens 910 may be formed of glass. The object-side surface and the image-side surface of the first lens 910 may be spherical. The first lens 910 may be a D-cut lens. For example, a length of the first lens 910 in the first axis direction, perpendicular to the optical axis direction, may be longer than a length thereof in the second axis direction, perpendicular to both the optical axis direction and the first axis direction.

The second lens 920 may have negative refractive power. An object-side surface and an image-side surface of the second lens 920 may have a concave shape in the paraxial region. The second lens 920 may be formed of plastic. The object-side surface and the image-side surface of the second lens 920 may be aspherical.

The third lens 930 may have positive refractive power. An object-side surface of the third lens 930 may have a concave shape in the paraxial region, and an image-side surface of the third lens 930 may have a convex shape in the paraxial region. The third lens 930 may be formed of plastic. Specifically, the third lens 930 may be formed of a plastic material with optical properties (e.g., different refractive index and Abbe number) different from the second lens 920.

The object-side surface and the image-side surface of the third lens 930 may be aspherical.

The fourth lens 940 may have negative refractive power. An object-side surface of the fourth lens 940 may have a convex shape in the paraxial region, and an image-side surface of the fourth lens 940 may have a concave shape in the paraxial region. The fourth lens 940 may be formed of plastic. Specifically, the fourth lens 940 may be formed of a plastic material with optical properties (e.g., different refractive index and Abbe number) different from the third lens 930. The object-side surface and the image-side surface of the fourth lens 940 may be aspherical. Additionally, the image-side surface of the fourth lens 940 may include an inflection point. For example, the image-side surface of the fourth lens 940 may have a concave shape in the paraxial region and may have a convex shape in the peripheral region.

Table 17 illustrates optical and physical parameters of the optical imaging system 900 according to the ninth embodiment.

TABLE 17

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 4.200 | 2.270 | 1.487 | 70.4 | 2.85 |
| 3 | 2506.644 | 1.723 | | | 2.53 |
| 4 | −9.109 | 0.997 | 1.614 | 25.9 | 1.90 |
| 5 | 7.106 | 1.100 | | | 1.70 |
| 6 | −169.209 | 0.950 | 1.660 | 20.4 | 1.88 |
| 7 | −10.050 | 0.600 | | | 1.80 |
| 8 | 30.621 | 0.870 | 1.544 | 56.0 | 1.78 |
| 9 | 11.883 | 2.420 | | | 1.86 |
| 10 | Infinity | 0.210 | 1.518 | 64.2 | 2.26 |
| 11 | Infinity | 7.857 | | | 2.28 |
| Image | Infinity | | | | 3.59 |

Table 18 illustrates aspheric data of the optical imaging system 900 according to the ninth

TABLE 18

| Surface | 2 | 3 | 4 | 5 | 6 | 7 | 8 | 9 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| A | 0.00E+00 | 0.00E+00 | −6.21E−03 | −7.24E−03 | 1.12E−04 | −2.13E−03 | −1.96E−02 | −1.60E−02 |
| B | 0.00E+00 | 0.00E+00 | 1.20E−03 | 1.54E−03 | −2.12E−05 | 9.54E−04 | 5.40E−04 | 2.12E−03 |
| C | 0.00E+00 | 0.00E+00 | −4.68E−04 | −1.16E−03 | −3.96E−04 | −2.09E−04 | 1.29E−03 | −6.15E−04 |
| D | 0.00E+00 | 0.00E+00 | 2.96E−04 | 8.59E−04 | 1.92E−04 | −5.69E−05 | −8.66E−04 | 1.51E−04 |
| E | 0.00E+00 | 0.00E+00 | −1.09E−04 | −3.41E−04 | −6.66E−05 | 3.62E−05 | 2.37E−04 | −1.62E−05 |
| F | 0.00E+00 | 0.00E+00 | 2.00E−05 | 6.66E−05 | 8.84E−06 | −1.55E−05 | −2.30E−05 | 4.28E−07 |
| G | 0.00E+00 | 0.00E+00 | −1.45E−06 | −5.03E−06 | 0.00E+00 | 4.85E−06 | 0.00E+00 | 0.00E+00 |
| H | 0.00E+00 | 0.00E+00 | 0.00E+00 | 0.00E+00 | 0.00E+00 | −7.21E−07 | 0.00E+00 | 0.00E+00 |
| J | 0.00E+00 | 0.00E+00 | 0.00E+00 | 0.00E+00 | 0.00E+00 | 4.10E−08 | 0.00E+00 | 0.00E+00 |
| L | 0.00E+00 | 0.00E+00 | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 | 0.00E+00 | 0.00E+00 |

Tenth Embodiment

Figure 10A:
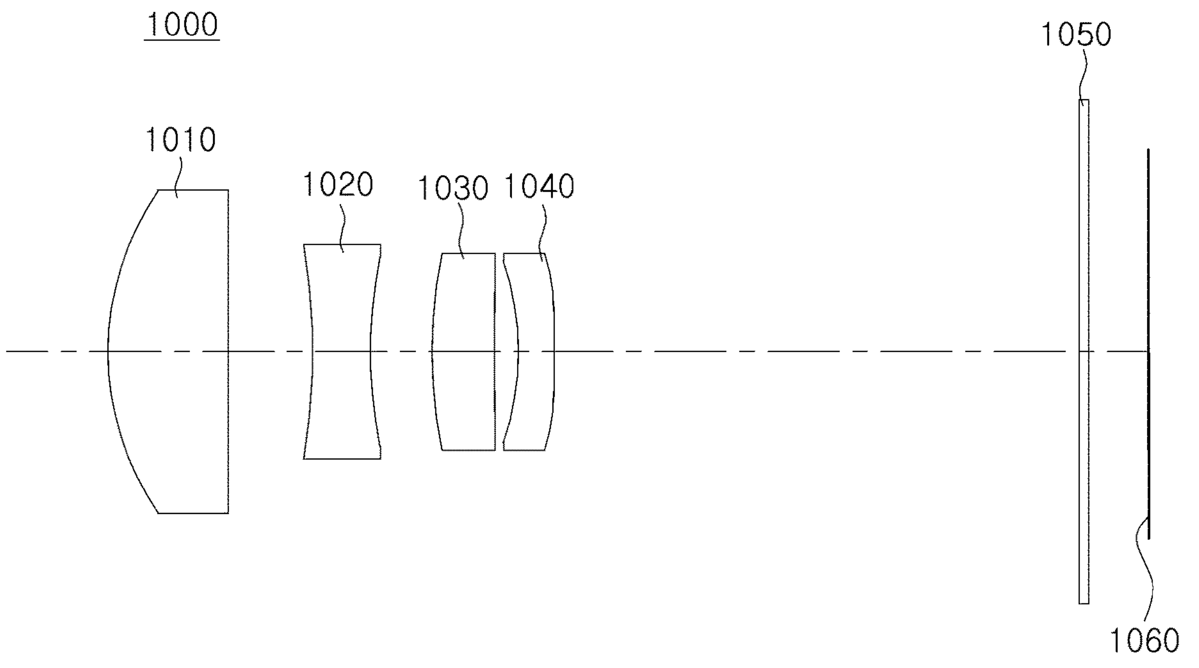
FIG. 10A illustrates an example optical imaging system according to a tenth embodiment.
Figure 10B:
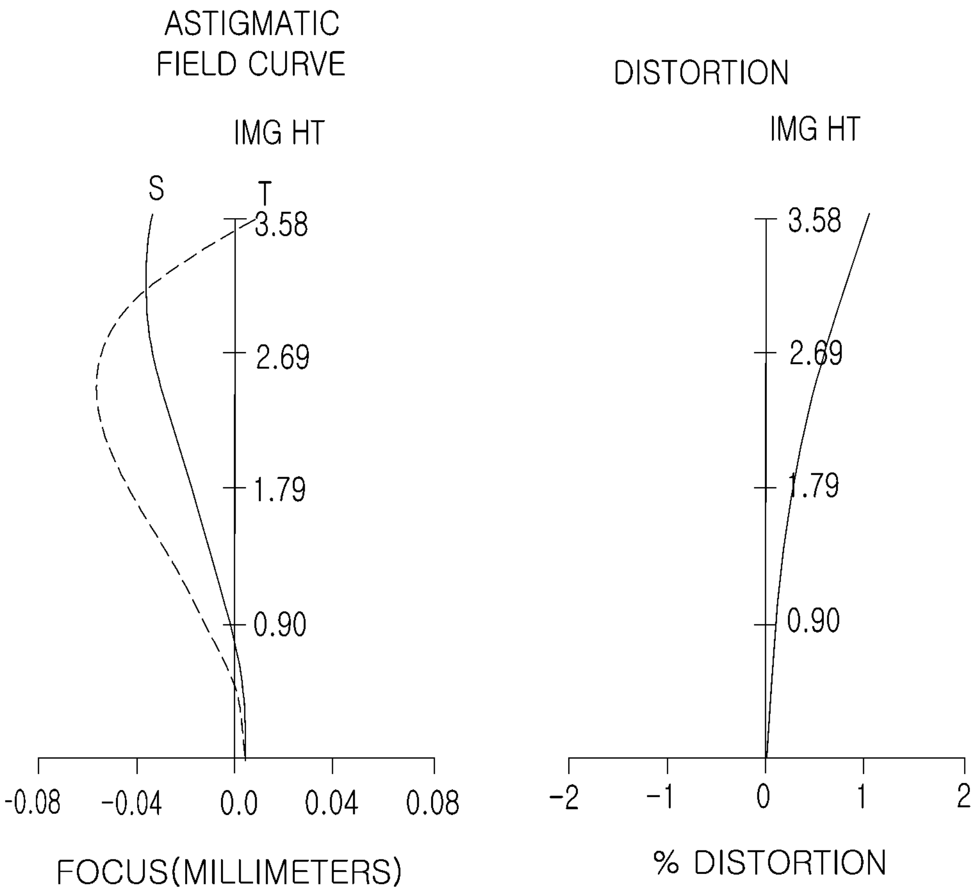
FIG. 10B is a graph illustrating aberration characteristics of the example optical imaging system according to the tenth embodiment.

FIG. 10A illustrates an example optical imaging system according to a tenth embodiment, and FIG. 10B is a graph illustrating aberration characteristics of an optical imaging system according to the tenth embodiment of the present disclosure.

An optical imaging system 1000 according to the tenth embodiment may include a first lens 1010, a second lens 1020, a third lens 1030, and a fourth lens 1040 arranged in order from an object side to an imaging plane, may further include an infrared blocking filter 1050 and an image sensor 1060 in an image side of the fourth lens 1040.

The first lens 1010 may have positive refractive power. An object-side surface of the first lens 1010 may have a convex shape in the paraxial region, and an image-side surface of the first lens 1010 may be flat. The first lens 1010 may be formed of glass. The object-side surface and the image-side surface of the first lens 1010 may be spherical. The first lens 1010 may be a D-cut lens. For example, a length of the first lens 1010 in the first axis direction, perpendicular to the optical axis direction, may be longer than a length thereof in the second axis direction, perpendicular to both the optical axis direction and the first axis direction.

The second lens 1020 may have negative refractive power. An object-side surface and an image-side surface of the second lens 1020 may have a concave shape in the paraxial region. The second lens 1020 may be formed of plastic. The object-side surface and the image-side surface of the second lens 1020 may be aspherical.

The third lens 1030 may have positive refractive power. An object-side surface and an image-side surface of the third lens 1030 may have a convex shape in the paraxial region. The third lens 1030 may be formed of plastic. Specifically, the third lens 1030 may be formed of a plastic material with optical properties (e.g., different refractive index and Abbe number) different from the second lens 1020. The object-side surface and the image-side surface of the third lens 1030 may be aspherical.

The fourth lens 1040 may have negative refractive power. An object-side surface and an image-side surface of the fourth lens 1040 may have a concave shape in the paraxial region. The fourth lens 1040 may be formed of plastic. Specifically, the fourth lens 1040 may be formed of a plastic material with optical properties (e.g., different refractive index and Abbe number) different from the third lens 1030. The object-side surface and the image-side surface of the fourth lens 1040 may be aspherical. Additionally, the image-side surface of the fourth lens 1040 may include an inflection point. For example, the image-side surface of the fourth lens 1040 may have a concave shape in the paraxial region and may have a convex shape in the peripheral region.

Table 19 illustrates optical and physical parameters of the optical imaging system 1000 according to the tenth embodiment.

TABLE 19

| Surface | Radius | Thickness/ Distance | Index | Abbe number | Semi-Aperture |
|---|---|---|---|---|---|
| Object | Infinity | Infinity | | | |
| 1 | Infinity | 0.000 | | | |
| 2 | 4.489 | 2.298 | 1.497 | 81.6 | 2.90 |
| 3 | Infinity | 1.595 | | | 2.54 |
| 4 | −18.000 | 1.050 | 1.615 | 26.0 | 1.90 |
| 5 | 5.774 | 1.140 | | | 1.70 |
| 6 | 16.508 | 1.200 | 1.661 | 20.4 | 1.75 |
| 7 | −22.796 | 0.400 | | | 1.63 |
| 8 | −19.081 | 0.682 | 1.544 | 56.0 | 1.62 |
| 9 | 68.381 | 9.735 | | | 1.74 |
| 10 | Infinity | 0.210 | 1.518 | 64.2 | 4.50 |
| 11 | Infinity | 1.000 | | | 4.50 |
| Image | Infinity | | | | 3.59 |

Table 20 illustrates aspheric data of the optical imaging system 1000 according to the tenth embodiment.

TABLE 20

| Surface | 2 | 3 | 4 | 5 | 6 | 7 | 8 | 9 |
|---|---|---|---|---|---|---|---|---|
| K | 0.00E+00 | 0.00E+00 | 0.00E+00 | 0.00E+00 | 0.00E+00 | 0.00E+00 | 0.00E+00 | 0.00E+00 |
| A | 0.00E+00 | 0.00E+00 | −7.21E−03 | −7.67E−03 | 5.90E−03 | −1.06E−03 | −3.42E−02 | −2.43E−02 |
| B | 0.00E+00 | 0.00E+00 | 1.59E−03 | 2.11E−03 | 6.32E−03 | 1.55E−02 | 1.14E−02 | 3.33E−03 |
| C | 0.00E+00 | 0.00E+00 | −7.01E−04 | −1.17E−03 | −8.28E−03 | −1.91E−02 | −1.11E−02 | −1.20E−03 |
| D | 0.00E+00 | 0.00E+00 | 3.20E−04 | 7.36E−04 | 8.02E−03 | 1.75E−02 | 8.73E−03 | 6.98E−04 |
| E | 0.00E+00 | 0.00E+00 | −9.64E−05 | −3.34E−04 | −5.04E−03 | −1.01E−02 | −4.10E−03 | −3.42E−04 |

TABLE 20-continued

| Surface | 2 | 3 | 4 | 5 | 6 | 7 | 8 | 9 |
|---|---|---|---|---|---|---|---|---|
| F | 0.00E+00 | 0.00E+00 | 1.64E−05 | 8.35E−05 | 2.01E−03 | 3.64E−03 | 9.65E−04 | 8.48E−05 |
| G | 0.00E+00 | 0.00E+00 | −1.17E−06 | −8.33E−06 | −4.94E−04 | −8.05E−04 | −8.62E−05 | −8.17E−06 |
| H | 0.00E+00 | 0.00E+00 | 0.00E+00 | 0.00E+00 | 6.88E−05 | 1.03E−04 | 0.00E+00 | 0.00E+00 |
| J | 0.00E+00 | 0.00E+00 | 0.00E+00 | 0.00E+00 | −4.16E−06 | −5.73E−06 | 0.00E+00 | 0.00E+00 |
| L | 0.00E+00 | 0.00E+00 | 0.00E+00 | 0.00E+00 | 0.00E+00 | 0.00E+00 | 0.00E+00 | 0.00E+00 |
| M | 0.00E+00 | 0.00E+00 | 0.00E+00 | 0.00E+00 | 0.00E+00 | 0.00E+00 | 0.00E+00 | 0.00E+00 |
| N | 0.00E+00 | 0.00E+00 | 0.00E+00 | 0.00E+00 | 0.00E+00 | 0.00E+00 | 0.00E+00 | 0.00E+00 |
| O | 0.00E+00 | 0.00E+00 | 0.00E+00 | 0.00E+00 | 0.00E+00 | 0.00E+00 | 0.00E+00 | 0.00E+00 |
| P | 0.00E+00 | 0.00E+00 | 0.00E+00 | 0.00E+00 | 0.00E+00 | 0.00E+00 | 0.00E+00 | 0.00E+00 |

Table 21 illustrates optical and physical parameters related to a focal length and a conditional equation of the optical imaging system according to the example embodiments.

TABLE 21

| | Ex1 | Ex2 | Ex3 | Ex4 | Ex5 | Ex6 | Ex7 | Ex8 | Ex9 | Ex10 |
|---|---|---|---|---|---|---|---|---|---|---|
| f | 22.320 | 22.373 | 22.350 | 22.379 | 22.364 | 22.363 | 22.366 | 22.363 | 22.373 | 22.363 |
| f1 | 9.489 | 8.983 | 8.753 | 9.127 | 8.967 | 8.894 | 8.917 | 9.082 | 8.627 | 9.033 |
| f2 | −14.523 | −6.529 | −7.119 | −7.000 | −6.981 | −7.101 | −7.110 | −6.886 | −6.342 | −6.990 |
| f3 | 208.251 | 14.838 | 15.675 | 14.887 | 15.646 | 15.637 | 15.268 | 14.313 | 16.132 | 14.669 |
| f4 | −31.823 | −36.875 | −25.488 | −29.095 | −32.364 | −27.386 | −26.442 | −28.544 | −36.298 | −27.355 |
| OAL | 19.102 | 19.310 | 19.307 | 19.309 | 19.309 | 19.310 | 19.309 | 19.306 | 18.997 | 19.310 |
| BFL | 10.433 | 11.249 | 10.797 | 10.856 | 11.420 | 10.800 | 10.800 | 11.005 | 10.487 | 10.945 |
| IMH | 3.58 | 3.58 | 3.58 | 3.58 | 3.58 | 3.58 | 3.58 | 3.58 | 3.58 | 3.58 |
| Fno | 3.73 | 3.73 | 3.92 | 3.92 | 3.92 | 392 | 3.92 | 4.04 | 3.92 | 4.04 |
| FOV | 18.00 | 18.04 | 18.05 | 18.00 | 18.04 | 18.04 | 18.04 | 18.03 | 18.02 | 18.03 |
| AR1 | 0.797 | 0.797 | 0.837 | 0.830 | 0.839 | 0.839 | 0.839 | 0.824 | 0.839 | 0.824 |
| D4/D1 | 0.533 | 0.633 | 0.655 | 0.586 | 0.655 | 0.655 | 0.620 | 0.586 | 0.655 | 0.586 |
| d2/d1 | 0.650 | 0.585 | 0.614 | 0.721 | 0.651 | 0.638 | 0.663 | 0.689 | 0.638 | 0.715 |

The optical imaging system according to the example embodiments described above may be manufactured to be slim, and to reduce the flare phenomenon.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An optical imaging system, comprising:

a first lens having positive refractive power, a second lens, a third lens, and a fourth lens arranged in order from an object side toward an image plane, wherein the first lens is formed of glass, and wherein conditional expressions $70<v1$, $0.8 \leq OAL/f \leq 0.9$, and $5<f1<10$ (unit: mm) is satisfied, where v1 is an Abbe number of the first lens, OAL is a distance from an object-side surface of the first lens to the image plane, f is a total focal length of the optical imaging system, and f1 is a focal length of the first lens.

2. The optical imaging system according to claim 1, wherein the fourth lens has a convex image-side surface in a paraxial region.

3. The optical imaging system according to claim 1, wherein the fourth lens has a concave image-side surface in a paraxial region, and a convex surface in a peripheral region.

4. The optical imaging system according to claim 1, wherein a conditional expression $4<OAL/\Sigma CT<6$ is satisfied, where ΣCT is a sum of thicknesses of the first lens to the third lens.

5. The optical imaging system according to claim 1, wherein the first lens is a D-cut lens, and a conditional expression $0.5<AR1<1.0$ is satisfied, where AR1 is an aspect ratio of an effective diameter of the first lens.

6. The optical imaging system according to claim 1, wherein a conditional expression $0.4 \leq d2/d1 \leq 1.0$ is satisfied, where d1 is a distance between the first lens and the second lens, and d2 is a distance between the second lens and the third lens.

7. The optical imaging system according to claim 1, wherein the second lens has negative refractive power, and the second lens has a concave object-side surface in a paraxial region.

8. The optical imaging system according to claim 1, wherein the third lens has positive refractive power, and a conditional expression $1.3<|f/f2+f/f3| \leq 2.3$ is satisfied, where f2 is a focal length of the second lens, and f3 is a focal length of the third lens.

9. The optical imaging system according to claim 1, wherein a conditional expression $0.15<R1/f\leq 0.25$ is satisfied, where R1 is a radius of curvature of the object-side surface of the first lens.

10. An optical imaging system, comprising:

a first lens having positive refractive power, a second lens, a third lens, and a fourth lens arranged in order from an object side toward an image plane, wherein conditional expressions $70<v1$, $0<v2-v3<15$, and $5<f1<10$ (unit: mm) are satisfied, where v1 is an Abbe number of the first lens, v2 is an Abbe number of the second lens, v3 is an Abbe number of the third lens and f1 is a focal length of the first lens.

11. The optical imaging system according to claim 10, wherein a conditional expression $0.5\leq D4/D1\leq 0.8$ is satisfied, where D1 is a maximum effective diameter of the first lens, and D4 is a maximum effective diameter of the fourth lens.

12. The optical imaging system according to claim 10, wherein in at least one of the second lens and the fourth lens, an object-side surface and an image-side surface thereof have a concave shape.

13. The optical imaging system according to claim 10, wherein the second lens has a convex image-side surface, and the fourth lens has a convex image-side surface.

14. The optical imaging system according to claim 10, wherein a conditional expression $0.8\leq OAL/f\leq 0.9$ is satisfied, where OAL is a distance from an object-side surface of the first lens to the image plane, and f is a total focal length of the optical imaging system.

15. The optical imaging system according to claim 10, wherein a conditional expression $0.4\leq BFL/f\leq 0.6$ is satisfied, where BFL is a distance from an image-side surface of the fourth lens to the image plane, and f is a total focal length of the optical imaging system.

* * * * *